(12) United States Patent
Li et al.

(10) Patent No.: US 12,256,391 B2
(45) Date of Patent: Mar. 18, 2025

(54) COMMUNICATION METHOD AND APPARATUS

(71) Applicant: Huawei Technologies Co., Ltd., Shenzhen (CN)

(72) Inventors: Xiangyu Li, Shanghai (CN); Xiao Xiao, Shenzhen (CN); Chang Yu, Shenzhen (CN); Jun Wang, Shanghai (CN); Wenjie Peng, Shanghai (CN); Mingzeng Dai, Shenzhen (CN); Dongdong Wei, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 602 days.

(21) Appl. No.: 17/562,527

(22) Filed: Dec. 27, 2021

(65) Prior Publication Data

US 2022/0124776 A1    Apr. 21, 2022

Related U.S. Application Data

(63) Continuation of application No. PCT/CN2020/098092, filed on Jun. 24, 2020.

(30) Foreign Application Priority Data

Jun. 28, 2019    (CN) .......................... 201910579768.1

(51) Int. Cl.
*H04W 72/21*    (2023.01)
*H04L 1/00*    (2006.01)
(Continued)

(52) U.S. Cl.
CPC .......... *H04W 72/21* (2023.01); *H04L 1/0008* (2013.01); *H04W 52/365* (2013.01);
(Continued)

(58) Field of Classification Search
CPC ............... H04W 72/21; H04W 52/365; H04W 72/1263; H04W 72/569; H04W 80/02; H04W 92/18
See application file for complete search history.

(56) References Cited

U.S. PATENT DOCUMENTS

| | | | |
|---|---|---|---|
| 2013/0114445 A1 | 5/2013 | Wen et al. | |
| 2018/0234995 A1* | 8/2018 | Jung | .................... H04W 72/569 |

(Continued)

FOREIGN PATENT DOCUMENTS

| | | |
|---|---|---|
| CN | 101820644 A | 9/2010 |
| CN | 104737613 A | 6/2015 |

(Continued)

OTHER PUBLICATIONS

R2-1907456 "Relative QoS Handling between NR SL and NR Uu" 3GPP WG2 #106 Reno May 13-17, 2019 (Year: 2019).*

(Continued)

*Primary Examiner* — Basil Ma
(74) *Attorney, Agent, or Firm* — SLATER MATSIL, LLP

(57) ABSTRACT

A terminal device obtains first configuration information, where the first configuration information includes indication information of a UL MAC CE. Then, the terminal device preferentially sends a UL MAC PDU or an SL MAC PDU based on the indication information, where the UL MAC PDU can be used to transmit the UL MAC CE.

20 Claims, 3 Drawing Sheets

(51) Int. Cl.
  *H04W 52/36* (2009.01)
  *H04W 72/1263* (2023.01)
  *H04W 72/566* (2023.01)
  *H04W 80/02* (2009.01)
  *H04W 92/18* (2009.01)

(52) U.S. Cl.
  CPC ..... *H04W 72/1263* (2013.01); *H04W 72/569* (2023.01); *H04W 80/02* (2013.01); *H04W 92/18* (2013.01)

(56) References Cited

U.S. PATENT DOCUMENTS

| | | | |
|---|---|---|---|
| 2020/0008183 A1* | 1/2020 | Chen | H04W 72/20 |
| 2021/0274545 A1* | 9/2021 | Adjakple | H04W 28/0268 |

FOREIGN PATENT DOCUMENTS

| | | |
|---|---|---|
| CN | 107079530 A | 8/2017 |
| CN | 107666647 A | 2/2018 |
| CN | 109565791 A | 4/2019 |
| CN | 110536354 A | 12/2019 |
| EP | 3397015 A1 | 10/2018 |

OTHER PUBLICATIONS

Zte et al., "Discussion on UL and SL prioritisation", 3GPP TSG RAN WG2 Meeting #108, R2-1914536, Reno, NV, US, Nov. 18-22, 2019, 4 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), 3GPP TS 36.300 V14.9.1 (Apr. 2019), 332 pages.

Huawei et al., "Further discussion on SR configuration and procedure for NR SL Mode-1", 3GPP TSG-RAN WG2 #106, R2-1907450, Reno, NV, US, May 13-17, 2019, 9 pages.

3rd Generation Partnership Project; Technical Specification Group Core Network and Terminals; User Equipment (UE) to V2X control function; protocol aspects; Stage 3 (Release 15), 3GPP TS 24.386 V15.2.0 (Dec. 2018), 35 pages.

3rd Generation Partnership Project; Technical Specification Group Services and System Aspects; Study on enhancement of 3GPP Support for 5G V2X Services (Release 16), 3GPP TR 22.886 V16.2.0 (Dec. 2018), 76 pages.

3rd Generation Partnership Project; Technical Specification Group Services and System Aspects; Enhancement of 3GPP support for V2X scenarios; Stage 1 (Release 16), 3GPP TS 22.186 V16.2.0 (Jun. 2019), 18 pages.

Huawei et al., "Relative QoS handling between NR SL and NR Uu", 3GPP TSG-RAN WG2 Meeting #106, R2-1907456, Reno, NV, US, May 13-17, 2019, 2 pages.

* cited by examiner

COMMUNICATION METHOD AND APPARATUS

CROSS-REFERENCE TO RELATED APPLICATIONS

This application is a continuation of International Application No. PCT/CN2020/098092, filed on Jun. 24, 2020, which claims priority to Chinese Patent Application No. 201910579768.1, filed on Jun. 28, 2019. The disclosures of the aforementioned applications are herein incorporated by reference in their entireties.

TECHNICAL FIELD

This application relates to the communication field, and in particular, to a communication method and apparatus.

BACKGROUND

Vehicle-to-everything (V2X) is considered as one of fields having greatest industry potential and clearest market requirements in an internet of things system. The V2X is characterized by large application space, great industry potential, and strong social benefits, and is of great significance to promote innovation and development of automobile and information communication industries, build new models and new business forms of automobile and transportation services, promote innovation and application of autonomous driving technologies, and improve transportation efficiency and a level safety.

Currently, in long term evolution (LTE) V2X, when an uplink (UL) conflicts with a sidelink (SL), for example, the UL and the SL overlap in time domain, if neither emergency call nor random access exists on the UL, a terminal device determines sending priorities of the UL and the SL based on only a priority of a medium access control (MAC) packet data unit (PDU) on the SL. The considered priority determining factor is not comprehensive. This may cause a problem that the determined sending priorities cannot satisfy actual communication requirements of the two links.

SUMMARY

Embodiments of this application provide a communication method and apparatus, to resolve a problem that UL transmission cannot be preferentially performed even though a service having a higher priority exists on a UL and that is caused because sending priorities of the UL and an SL are determined based on only a priority of an SL MAC PDU, so as to improve overall communication efficiency of a terminal device.

To achieve the foregoing objectives, the following technical solutions are used in this application.

According to a first aspect, a communication method is provided. The communication method includes: A terminal device obtains first configuration information. For example, the first configuration information includes indication information of an uplink medium access control control element UL MAC CE. Then, the terminal device preferentially sends an uplink medium access control packet data unit UL MAC PDU or a sidelink medium access control packet data unit SL MAC PDU based on the indication information. For example, the UL MAC PDU can be used to transmit the UL MAC CE. Based on this solution, the terminal device can obtain the first configuration information, determine, based on the indication information of the UL MAC CE in the first configuration information, whether the UL MAC PDU includes the specified UL MAC CE, and then preferentially send the UL MAC PDU or the SL MAC PDU based on a determining result. In other words, the terminal device may determine whether the UL MAC PDU includes the specified UL MAC CE, and determine sending priorities of a UL and an SL, to ensure that data transmitted on a link having a higher sending priority is preferentially transmitted. In this way, a problem that UL transmission cannot be preferentially performed even though a service having a higher priority, such as a URLLC service, exists on the UL and that is caused because the sending priorities of the UL and the SL are determined based on only a priority of the SL MAC PDU can be resolved, so that actual communication requirements on the two links, namely, the UL and the SL, can be comprehensively considered, thereby improving overall communication efficiency of the terminal device.

It should be noted that the "specified UL MAC CE" may be implemented by one or more of the following: a UL MAC CE pre-configured by a network device, a UL MAC CE dynamically configured by the network device by using signaling, or a UL MAC CE predefined in a protocol and written into an internal buffer of the terminal device during manufacturing or network access of the terminal device. A specific implementation of the "specified UL MAC CE" is not specifically limited in this application.

For example, the UL MAC CE may include one or more of the following: a cell radio network temporary identifier MAC CE, a configured grant confirmation MAC CE, a MAC CE for a link buffer status report BSR with exception of a BSR included for padding, a MAC CE for a sidelink buffer status report SL BSR with exception of an SL BSR included for padding, and a power headroom report MAC CE.

In a possible design method, that a terminal device obtains first configuration information may include: The terminal device receives the first configuration information from the network device; or the terminal device obtains the first configuration information from a local buffer.

In a possible design method, that the terminal device preferentially sends an uplink medium access control packet data unit UL MAC PDU or a sidelink medium access control packet data unit SL MAC PDU based on the indication information may include: If the UL MAC PDU and the SL MAC PDU satisfy a first condition, the terminal device preferentially sends the SL MAC PDU. For example, the first condition is that the UL MAC PDU does not include random access data, the UL MAC PDU does not include emergency call data, the UL MAC PDU does not include the specified UL MAC CE, and a priority of the UL MAC PDU is lower than or equal to the priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

In another possible design method, that the terminal device preferentially sends an uplink medium access control packet data unit UL MAC PDU or a sidelink medium access control packet data unit SL MAC PDU based on the indication information may include: If the UL MAC PDU and the SL MAC PDU satisfy a second condition, the terminal device preferentially sends the SL MAC PDU. For example, the second condition is that the UL MAC PDU does not include random access data, the UL MAC PDU does not include emergency call data, and a priority of the UL MAC PDU is lower than or equal to the priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

Optionally, that the terminal device preferentially sends the SL MAC PDU may include: The terminal device sends the SL MAC PDU, and skips sending the UL MAC PDU; the terminal device sends the UL MAC PDU and the SL MAC PDU, and reduces a transmit power of the UL MAC PDU; or the terminal device sends the UL MAC PDU and the SL MAC PDU, and increases a transmit power of the SL MAC PDU.

Further, that the terminal device sends the SL MAC PDU, and skips sending the UL MAC PDU may include: The terminal device sends the SL MAC PDU, and skips sending the UL MAC PDU, if the UL MAC PDU and the SL MAC PDU overlap in time domain.

For example, that the terminal device sends the SL MAC PDU, and skips sending the UL MAC PDU, if the UL MAC PDU and the SL MAC PDU overlap in time domain may include: If the UL MAC PDU and the SL MAC PDU overlap in time domain and use a same transmit frequency, the terminal device sends the SL MAC PDU, and skips sending the UL MAC PDU; or if the UL MAC PDU and the SL MAC PDU overlap in time domain and use different transmit frequencies, the terminal device sends the SL MAC PDU, and skips sending the UL MAC PDU.

Further, that the terminal device sends the UL MAC PDU and the SL MAC PDU, and reduces a transmit power of the UL MAC PDU may include: If the UL MAC PDU and the SL MAC PDU overlap in time domain and use different transmit frequencies, the terminal device sends the UL MAC PDU and the SL MAC PDU, and reduces the transmit power of the UL MAC PDU.

Further, that the terminal device sends the UL MAC PDU and the SL MAC PDU, and increases a transmit power of the SL MAC PDU may include: If the UL MAC PDU and the SL MAC PDU overlap in time domain and use different transmit frequencies, the terminal device sends the UL MAC PDU and the SL MAC PDU, and increases the transmit power of the SL MAC PDU.

In a possible design method, that the terminal device preferentially sends an uplink medium access control packet data unit UL MAC PDU or a sidelink medium access control packet data unit SL MAC PDU based on the indication information may include: If the UL MAC PDU includes the specified UL MAC CE, the terminal device preferentially sends the UL MAC PDU.

Specifically, that the terminal device preferentially sends the UL MAC PDU may include: The terminal device sends the UL MAC PDU, and skips sending the SL MAC PDU; the terminal device sends the UL MAC PDU and the SL MAC PDU, and reduces a transmit power of the SL MAC PDU; or the terminal device sends the UL MAC PDU and the SL MAC PDU, and increases a transmit power of the UL MAC PDU.

Further, that the terminal device sends the UL MAC PDU, and skips sending the SL MAC PDU may include: The terminal device sends the UL MAC PDU, and skips sending the SL MAC PDU, if the UL MAC PDU and the SL MAC PDU overlap in time domain.

For example, that the terminal device sends the UL MAC PDU, and skips sending the SL MAC PDU, if the UL MAC PDU and the SL MAC PDU overlap in time domain may include: If the UL MAC PDU and the SL MAC PDU overlap in time domain and use a same transmit frequency, the terminal device sends the UL MAC PDU, and skips sending the SL MAC PDU; or if the UL MAC PDU and the SL MAC PDU overlap in time domain and use different transmit frequencies, the terminal device sends the UL MAC PDU, and skips sending the SL MAC PDU.

Further, that the terminal device sends the UL MAC PDU and the SL MAC PDU, and reduces a transmit power of the SL MAC PDU may include: If the UL MAC PDU and the SL MAC PDU overlap in time domain and use different transmit frequencies, the terminal device sends the UL MAC PDU and the SL MAC PDU, and reduces the transmit power of the SL MAC PDU.

Further, that the terminal device sends the UL MAC PDU and the SL MAC PDU, and increases a transmit power of the UL MAC PDU may include: If the UL MAC PDU and the SL MAC PDU overlap in time domain and use different transmit frequencies, the terminal device sends the UL MAC PDU and the SL MAC PDU, and increases the transmit power of the UL MAC PDU.

According to a second aspect, a communication method is provided. The communication method includes: A terminal device receives second configuration information from a network device. For example, the second configuration information includes a first mapping relationship and/or a second mapping relationship used by the terminal device to compare a priority of a logical channel that triggers a scheduling request SR with a priority of a sidelink logical channel included in a sidelink medium access control packet data unit SL MAC PDU. Then, the terminal device preferentially sends the SR or the SL MAC PDU based on a priority comparison result. Based on this solution, the terminal device receives the second configuration information from the network device, compares, based on the first mapping relationship or the second mapping relationship in the second configuration information, the priority of the logical channel that triggers the SR on a UL with the priority of the sidelink logical channel included in the SL MAC PDU, and preferentially sends the SR on the UL or the SL MAC PDU based on the priority comparison result. In other words, the terminal device may compare priorities of to-be-transmitted data, such as the SR and the SL MAC PDU, on two links, namely, the UL and an SL, and comprehensively determine sending priorities of the UL and the SL based on the priority comparison result, to ensure that data transmitted on a link having a higher sending priority is preferentially transmitted. In this way, a problem that UL transmission cannot be preferentially performed even though a service having a higher priority, such as an SR triggered by a URLLC service, exists on the UL and that is caused because the sending priorities of the UL and the SL are determined based on only a priority of the SL MAC PDU can be resolved, so that actual communication requirements on the two links, namely, the UL and the SL, can be comprehensively considered, thereby improving overall communication efficiency of the terminal device.

In a possible design method, the SR may include an uplink scheduling request UL SR; and the first mapping relationship is used to convert the priority of the logical channel that triggers the scheduling request SR into a mapping priority that can be compared with the priority of the sidelink logical channel included in the sidelink medium access control packet data unit SL MAC PDU. Correspondingly, that the terminal device preferentially sends the SR or the SL MAC PDU based on the second configuration information may include: The terminal device converts, based on the first mapping relationship, a highest priority of a logical channel that triggers the UL SR into a first mapping priority. Then, if a highest priority of the sidelink logical channel included in the SL MAC PDU is higher than or equal to the first mapping priority, the terminal device preferentially sends the SL MAC PDU.

In another possible design method, the SR may include an uplink scheduling request UL SR; and the second mapping relationship is used to convert the priority of the sidelink logical channel included in the SL MAC PDU into a mapping priority that can be compared with the priority of the logical channel that triggers the SR. Correspondingly, that the terminal device preferentially sends the SR or the SL MAC PDU based on the priority comparison result may include: The terminal device converts, based on the second mapping relationship, a highest priority of the sidelink logical channel included in the SL MAC PDU into a second mapping priority. Then, if the second mapping priority is higher than or equal to a highest priority of a logical channel that triggers the UL SR, the terminal device preferentially sends the SL MAC PDU.

Optionally, that the terminal device preferentially sends the SL MAC PDU may include: The terminal device sends the SL MAC PDU, and skips sending the SR; the terminal device sends the SR and the SL MAC PDU, and reduces a transmit power of the SR; or the terminal device sends the SR and the SL MAC PDU, and increases a transmit power of the SL MAC PDU.

In a possible design method, the SR may include an uplink scheduling request UL SR; and the first mapping relationship is used to convert the priority of the logical channel that triggers the scheduling request SR into a mapping priority that can be compared with the priority of the sidelink logical channel included in the sidelink medium access control packet data unit SL MAC PDU. Correspondingly, that the terminal device preferentially sends the SR or the SL MAC PDU based on a priority comparison result may include: The terminal device converts, based on the first mapping relationship, a highest priority of a logical channel that triggers the UL SR into a first mapping priority. Then, if a highest priority of the sidelink logical channel included in the SL MAC PDU is lower than or equal to the first mapping priority, the terminal device preferentially sends the UL SR.

In another possible design method, the SR may include an uplink scheduling request UL SR; and the second mapping relationship is used to convert the priority of the sidelink logical channel included in the SL MAC PDU into a mapping priority that can be compared with the priority of the logical channel that triggers the SR. Correspondingly, that the terminal device preferentially sends the SR or the SL MAC PDU based on the priority comparison result may include: The terminal device converts, based on the second mapping relationship, a highest priority of the sidelink logical channel included in the SL MAC PDU into a second mapping priority. Then, if the second mapping priority is lower than or equal to a highest priority of a logical channel that triggers the UL SR, the terminal device preferentially sends the UL SR.

Optionally, that the terminal device preferentially sends the SR may include: The terminal device sends the SR, and skips sending the SL MAC PDU; the terminal device sends the SR and the SL MAC PDU, and reduces a transmit power of the SL MAC PDU; or the terminal device sends the SR and the SL MAC PDU, and increases a transmit power of the SR.

According to a third aspect, a communication method is provided. The communication method includes: A network device sends first configuration information and/or second configuration information to a terminal device. For example, the first configuration information includes indication information of an uplink medium access control control element UL MAC CE, the indication information is used to indicate the terminal device to preferentially send an uplink medium access control packet data unit UL MAC PDU or a sidelink medium access control packet data unit SL MAC PDU, and the UL MAC PDU can be used to transmit the UL MAC CE. The second configuration information includes a first mapping relationship and/or a second mapping relationship that are used by the terminal device to compare a priority of a logical channel that triggers a scheduling request SR with a priority of a sidelink logical channel included in the sidelink medium access control packet data unit SL MAC PDU, so that the terminal device preferentially sends the SR or the SL MAC PDU based on a priority comparison result.

In a possible design method, that the terminal device preferentially sends the uplink medium access control packet data unit UL MAC PDU or the sidelink medium access control packet data unit SL MAC PDU may include: If the UL MAC PDU includes the specified UL MAC CE, the terminal device preferentially sends the UL MAC PDU.

In a possible design method, that the terminal device preferentially sends the uplink medium access control packet data unit UL MAC PDU or the sidelink medium access control packet data unit SL MAC PDU may include: If the UL MAC PDU and the SL MAC PDU satisfy a first condition, the terminal device preferentially sends the SL MAC PDU. For example, the first condition may be that the UL MAC PDU does not include random access data, the UL MAC PDU does not include emergency call data, the UL MAC PDU does not include the specified UL MAC CE, and a priority of the UL MAC PDU is lower than or equal to a priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

In another possible design method, that the terminal device preferentially sends the uplink medium access control packet data unit UL MAC PDU or the sidelink medium access control packet data unit SL MAC PDU may include: If the UL MAC PDU and the SL MAC PDU satisfy a second condition, the terminal device preferentially sends the SL MAC PDU. For example, the second condition is that the UL MAC PDU does not include random access data, the UL MAC PDU does not include emergency call data, and a priority of the UL MAC PDU is lower than or equal to a priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

In a possible design method, the SR may include an uplink scheduling request UL SR; and the first mapping relationship is used to convert a priority of a logical channel that triggers the UL SR into a mapping priority that can be compared with the priority of the sidelink logical channel included in the SL MAC PDU. Correspondingly, that the terminal device compares the priority of the logical channel that triggers the scheduling request SR with the priority of the sidelink logical channel included in the sidelink medium access control packet data unit SL MAC PDU, and preferentially sends the SR or the SL MAC PDU based on the priority comparison result may include: The terminal device converts, based on the first mapping relationship, the highest priority of the logical channel that triggers the UL SR to the first mapping priority. Then, the terminal device preferentially sends the SR or the SL MAC PDU based on a result of comparing the first mapping priority with a highest priority of the sidelink logical channel included in the SL MAC PDU.

In another possible design method, the SR may include an uplink scheduling request UL SR; and the second mapping relationship is used to convert the priority of the sidelink logical channel included in the SL MAC PDU into a mapping priority that can be compared with a priority of a logical channel that triggers the UL SR. Correspondingly, that the terminal device compares the priority of the logical channel that triggers the scheduling request SR with the priority of the sidelink logical channel included in the sidelink medium access control packet data unit SL MAC PDU, and preferentially sends the SR or the SL MAC PDU based on the priority comparison result may include: The terminal device converts, based on the second mapping relationship, a highest priority of the sidelink logical channel included in the SL MAC PDU into a second mapping priority. Then, the terminal device preferentially sends the SR or the SL MAC PDU based on a result of comparing a highest priority of the logical channel that triggers the UL SR with the second mapping priority.

It should be noted that, for technical effects related to the first configuration information and technical effects related to the second configuration information in the third aspect, refer to the first aspect and the second aspect respectively. Details are not described herein again.

According to a fourth aspect, a communication apparatus is provided. The communication apparatus may include a processing module and a transceiver module. The processing module is configured to obtain first configuration information, where the first configuration information includes indication information of an uplink medium access control control element UL MAC CE. The processing module is further configured to: preferentially send, in coordination with the transceiver module, an uplink medium access control packet data unit UL MAC PDU or a sidelink medium access control packet data unit SL MAC PDU based on the indication information, where the UL MAC PDU can be used to transmit the UL MAC CE.

For example, the UL MAC CE may include one or more of the following: a cell radio network temporary identifier MAC CE, a configured grant confirmation MAC CE, a MAC CE for a link buffer status report BSR with exception of a BSR included for padding, a MAC CE for a sidelink buffer status report SL BSR with exception of an SL BSR included for padding, and a power headroom report MAC CE.

In a possible design, the processing module is further configured to receive the first configuration information from a network device in coordination with the transceiver module; or the processing module is further configured to obtain the first configuration information from a local buffer of the communication apparatus.

In a possible design, the processing module is further configured to: if the UL MAC PDU and the SL MAC PDU satisfy a first condition, preferentially send the SL MAC PDU in coordination with the transceiver module. For example, the first condition is that the UL MAC PDU does not include random access data, the UL MAC PDU does not include emergency call data, the UL MAC PDU does not include the specified UL MAC CE, and a priority of the UL MAC PDU is lower than or equal to a priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

In another possible design, the processing module is further configured to: if the UL MAC PDU and the SL MAC PDU satisfy a second condition, preferentially send the SL MAC PDU in coordination with the transceiver module. For example, the second condition is that the UL MAC PDU does not include random access data, the UL MAC PDU does not include emergency call data, and a priority of the UL MAC PDU is lower than or equal to a priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

Optionally, the processing module is further configured to send, in coordination with the transceiver module, the SL MAC PDU and skip sending the UL MAC PDU; the processing module is further configured to send, in coordination with the transceiver module, the UL MAC PDU and the SL MAC PDU, and reduce a transmit power of the UL MAC PDU; or the processing module is further configured to send, in coordination with the transceiver module, the UL MAC PDU and the SL MAC PDU, and increase a transmit power of the SL MAC PDU.

Further, the processing module is further configured to: if the UL MAC PDU and the SL MAC PDU overlap in time domain, send, in coordination with the transceiver module, the SL MAC PDU and skip sending the UL MAC PDU.

For example, the processing module is further configured to: if the UL MAC PDU and the SL MAC PDU overlap in time domain and use a same transmit frequency, send, in coordination with the transceiver module, the SL MAC PDU and skip sending the UL MAC PDU; or the processing module is further configured to: if the UL MAC PDU and the SL MAC PDU overlap in time domain and use different transmit frequencies, send, in coordination with the transceiver module, the SL MAC PDU and skip sending the UL MAC PDU.

Further, the processing module is further configured to: if the UL MAC PDU and the SL MAC PDU overlap in time domain and use different transmit frequencies, send, in coordination with the transceiver module, the UL MAC PDU and the SL MAC PDU, and reduce the transmit power of the UL MAC PDU.

Further, the processing module is further configured to: if the UL MAC PDU and the SL MAC PDU overlap in time domain and use different transmit frequencies, send, in coordination with the transceiver module, the UL MAC PDU and the SL MAC PDU, and increase the transmit power of the SL MAC PDU.

In a possible design, the processing module is further configured to: if the UL MAC PDU includes the UL MAC CE, preferentially send the UL MAC PDU in coordination with the transceiver module.

Specifically, the processing module is further configured to send, in coordination with the transceiver module, the UL MAC PDU and skip sending the SL MAC PDU; the processing module is further configured to send, in coordination with the transceiver module, the UL MAC PDU and the SL MAC PDU, and reduce a transmit power of the SL MAC PDU; or the processing module is further configured to send, in coordination with the transceiver module, the UL MAC PDU and the SL MAC PDU, and increase a transmit power of the UL MAC PDU.

Further, the processing module is further configured to: if the UL MAC PDU and the SL MAC PDU overlap in time domain, send, in coordination with the transceiver module, the UL MAC PDU and skip sending the SL MAC PDU.

For example, the processing module is further configured to: if the UL MAC PDU and the SL MAC PDU overlap in time domain and use a same transmit frequency, send, in coordination with the transceiver module, the UL MAC PDU and skip sending the SL MAC PDU; or the processing module is further configured to: if the UL MAC PDU and the SL MAC PDU overlap in time domain and use different transmit frequencies, send, in coordination with the transceiver module, the UL MAC PDU and skip sending the SL MAC PDU.

Further, the processing module is further configured to: if the UL MAC PDU and the SL MAC PDU overlap in time domain and use different transmit frequencies, send, in coordination with the transceiver module, the UL MAC PDU and the SL MAC PDU, and reduce the transmit power of the SL MAC PDU.

Further, the processing module is further configured to: if the UL MAC PDU and the SL MAC PDU overlap in time domain and use different transmit frequencies, send, in coordination with the transceiver module, the UL MAC PDU and the SL MAC PDU, and increase the transmit power of the UL MAC PDU.

Optionally, the communication apparatus according to the fourth aspect may further include a storage module. The storage module stores a program or instructions. When the processing module executes the program or the instructions, the communication apparatus according to the fourth aspect is enabled to perform a function of the terminal device according to the first aspect.

It should be noted that the communication apparatus according to the fourth aspect may be a terminal device, or may be a chip or a chip system disposed in the terminal device. This is not limited in this application.

For technical effects of the communication apparatus according to the fourth aspect, refer to the technical effects of the communication method according to the first aspect. Details are not described herein again.

According to a fifth aspect, a communication apparatus is provided. The communication apparatus may include a processing module and a transceiver module. The transceiver module is configured to receive second configuration information from a network device, where the second configuration information includes a first mapping relationship and/or a second mapping relationship used by the communication apparatus to compare a priority of a logical channel that triggers a scheduling request SR with a priority of a sidelink logical channel included in a sidelink medium access control packet data unit SL MAC PDU The processing module is configured to: preferentially send the SR or the SL MAC PDU based on a priority comparison result in coordination with the transceiver module.

In a possible design, the SR may include an uplink scheduling request UL SR; and the first mapping relationship is used to convert the priority of the logical channel that triggers the scheduling request SR into a mapping priority that can be compared with the priority of the sidelink logical channel included in the sidelink medium access control packet data unit SL MAC PDU. Correspondingly, the processing module is further configured to convert, based on the first mapping relationship, a highest priority of a logical channel that triggers the UL SR into a first mapping priority; and the processing module is further configured to: if a highest priority of the sidelink logical channel included in the SL MAC PDU is higher than or equal to the first mapping priority, preferentially send the SL MAC PDU in coordination with the transceiver module.

In another possible design, the SR may include an uplink scheduling request UL SR; and the second mapping relationship is used to convert the priority of the sidelink logical channel included in the SL MAC PDU into a mapping priority that can be compared with the priority of the logical channel that triggers the SR. Correspondingly, the processing module is further configured to convert, based on the second mapping relationship, a highest priority of the sidelink logical channel included in the SL MAC PDU into a second mapping priority; and the processing module is further configured to: if the second mapping priority is higher than or equal to a highest priority of a logical channel that triggers the UL SR, preferentially send the SL MAC PDU in coordination with the transceiver module.

Optionally, the processing module is further configured to send, in coordination with the transceiver module, the SL MAC PDU and skip sending the SR; the processing module is further configured to send, in coordination with the transceiver module, the SR and the SL MAC PDU, and reduce a transmit power of the SR; or the processing module is further configured to send, in coordination with the transceiver module, the SR and the SL MAC PDU, and increase a transmit power of the SL MAC PDU.

In a possible design, the SR may include an uplink scheduling request UL SR; and the first mapping relationship is used to convert the priority of the logical channel that triggers the scheduling request SR into a mapping priority that can be compared with the priority of the sidelink logical channel included in the sidelink medium access control packet data unit SL MAC PDU. Correspondingly, the processing module is further configured to convert, based on the first mapping relationship, a highest priority of a logical channel that triggers the UL SR into a first mapping priority; and the processing module is further configured to: if a highest priority of the sidelink logical channel included in the SL MAC PDU is lower than or equal to the first mapping priority, preferentially send the UL SR in coordination with the transceiver module.

In another possible design, the SR may include an uplink scheduling request UL SR; and the second mapping relationship is used to convert the priority of the sidelink logical channel included in the SL MAC PDU into a mapping priority that can be compared with the priority of the logical channel that triggers the SR. Correspondingly, the processing module is further configured to convert, based on the second mapping relationship, a highest priority of the sidelink logical channel included in the SL MAC PDU into a second mapping priority; and the processing module is further configured to: if the second mapping priority is lower than or equal to a highest priority of a logical channel that triggers the UL SR, preferentially send the UL SR in coordination with the transceiver module.

Optionally, the processing module is further configured to send, in coordination with the transceiver module, the SR and skip sending the SL MAC PDU; the processing module is further configured to send, in coordination with the transceiver module, the SR and the SL MAC PDU, and reduce a transmit power of the SL MAC PDU; or the processing module is further configured to send, in coordination with the transceiver module, the SR and the SL MAC PDU, and increase a transmit power of the SR.

Optionally, the communication apparatus according to the fifth aspect may further include a storage module. The storage module stores a program or instructions. When the processing module executes the program or the instructions, the communication apparatus according to the fifth aspect is enabled to perform a function of the terminal device according to the second aspect.

It should be noted that the communication apparatus according to the fifth aspect may be a terminal device, or may be a chip or a chip system disposed in the terminal device. This is not limited in this application.

For technical effects of the communication apparatus according to the fifth aspect, refer to the technical effects of the communication method according to the second aspect. Details are not described herein again.

According to a sixth aspect, a communication apparatus is provided. The communication apparatus may include a processing module and a transceiver module. The processing module is configured to send first configuration information and/or second configuration information to a terminal device in coordination with the transceiver module. For example, the first configuration information includes indication information of an uplink medium access control control element UL MAC CE, the indication information is used to indicate the terminal device to preferentially send an uplink medium access control packet data unit UL MAC PDU or a sidelink medium access control packet data unit SL MAC PDU, and the UL MAC PDU can be used to transmit the UL MAC CE. The second configuration information includes a first mapping relationship and/or a second mapping relationship that are used by the terminal device to compare a priority of a logical channel that triggers a scheduling request SR with a priority of a sidelink logical channel included in the sidelink medium access control packet data unit SL MAC PDU, and preferentially send the SR or the SL MAC PDU based on a priority comparison result.

In a possible design, that the terminal device preferentially sends the uplink medium access control packet data unit UL MAC PDU or the sidelink medium access control packet data unit SL MAC PDU may include: If the UL MAC PDU includes the specified UL MAC CE, the terminal device preferentially sends the UL MAC PDU.

In another possible design, that the terminal device preferentially sends the uplink medium access control packet data unit UL MAC PDU or the sidelink medium access control packet data unit SL MAC PDU may include: If the UL MAC PDU and the SL MAC PDU satisfy a first condition, the terminal device preferentially sends the SL MAC PDU. For example, the first condition is that the UL MAC PDU does not include random access data, the UL MAC PDU does not include emergency call data, the UL MAC PDU does not include the specified UL MAC CE, and a priority of the UL MAC PDU is lower than or equal to a priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

In another possible design, that the terminal device preferentially sends the uplink medium access control packet data unit UL MAC PDU or the sidelink medium access control packet data unit SL MAC PDU may include: If the UL MAC PDU and the SL MAC PDU satisfy a second condition, the terminal device preferentially sends the SL MAC PDU. For example, the second condition is that the UL MAC PDU does not include random access data, the UL MAC PDU does not include emergency call data, and a priority of the UL MAC PDU is lower than or equal to a priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

In a possible design, the SR may include an uplink scheduling request UL SR, the second configuration information includes a first mapping relationship, and the first mapping relationship is used to convert a priority of a logical channel that triggers the UL SR into a mapping priority that can be compared with the priority of the sidelink logical channel included in the SL MAC PDU. Correspondingly, that the terminal device compares the priority of the logical channel that triggers the scheduling request SR with the priority of the sidelink logical channel included in the sidelink medium access control packet data unit SL MAC PDU, and preferentially sends the SR or the SL MAC PDU based on the priority comparison result may include: The terminal device converts, based on the first mapping relationship, a highest priority of the logical channel that triggers the UL SR into a first mapping priority; and the terminal device preferentially sends the SR or the SL MAC PDU based on a result of comparing the first mapping priority with a highest priority of the sidelink logical channel included in the SL MAC PDU.

In another possible design, the SR may include an uplink scheduling request UL SR, the second configuration information further includes a second mapping relationship, and the second mapping relationship is used to convert the priority of the sidelink logical channel included in the SL MAC PDU into a mapping priority that can be compared with a priority of a logical channel that triggers the UL SR. Correspondingly, that the terminal device compares the priority of the logical channel that triggers the scheduling request SR with the priority of the sidelink logical channel included in the sidelink medium access control packet data unit SL MAC PDU, and preferentially sends the SR or the SL MAC PDU based on the priority comparison result may include: The terminal device converts, based on the second mapping relationship, a highest priority of the sidelink logical channel included in the SL MAC PDU into a second mapping priority; and preferentially sends the SR or the SL MAC PDU based on a result of comparing a highest priority of the logical channel that triggers the UL SR with the second mapping priority.

Optionally, the communication apparatus according to the sixth aspect may further include a storage module. The storage module stores a program or instructions. When the processing module executes the program or the instructions, the communication apparatus according to the sixth aspect is enabled to perform a function of the network device according to the third aspect.

It should be noted that the communication apparatus according to the sixth aspect may be a network device, or may be a chip or a chip system disposed in the network device. This is not limited in this application.

For technical effects of the communication apparatus according to the sixth aspect, refer to the technical effects of the communication method according to the third aspect. Details are not described herein again.

According to a seventh aspect, a communication apparatus is provided. The communication apparatus is configured to implement the foregoing communication methods. The communication apparatus may be the terminal device according to the first aspect, the second aspect, the fourth aspect, or the fifth aspect, for example, an in-vehicle communication apparatus, or an apparatus including the terminal device, such as various types of vehicles, or an apparatus or a component, such as a system chip, included in the terminal device; or the communication apparatus may be the network device according to the third aspect or the sixth aspect, or an apparatus or a component, such as a system chip, included in the network device. The communication apparatus includes a corresponding module, unit, or means (means) for implementing the foregoing communication method. The module, unit, or means may be implemented by hardware, software, or hardware executing corresponding software. The hardware or the software includes one or more modules or units corresponding to the foregoing functions.

According to an eighth aspect, a communication apparatus is provided. The communication apparatus includes a processor and a memory. The memory is configured to store computer instructions. When the processor executes the instructions, the communication apparatus is enabled to perform the communication method according to any one of the first aspect to the third aspect. The communication apparatus may be the terminal device according to the first aspect, the second aspect, the fourth aspect, or the fifth aspect, for example, an in-vehicle communication apparatus, or an apparatus including the terminal device, such as various types of vehicles, or an apparatus or a component, such as a system chip, included in the terminal device; or the communication apparatus may be the network device according to the third aspect or the sixth aspect, or an apparatus or a component, such as a system chip, included in the network device.

According to a ninth aspect, a communication apparatus is provided. The apparatus includes a processor. The processor is coupled to a memory. The processor is configured to read and execute instructions in the memory, so that the communication apparatus performs the communication method according to any one of the first aspect to the third aspect. The communication apparatus may be the terminal device according to the first aspect, the second aspect, the fourth aspect, or the fifth aspect, for example, an in-vehicle communication apparatus, or an apparatus including the terminal device, such as various types of vehicles, or an apparatus or a component, such as a system chip, included in the terminal device; or the communication apparatus may be the network device according to the third aspect or the sixth aspect, or an apparatus or a component, such as a system chip, included in the network device.

For technical effects of the communication apparatus according to the seventh aspect to the ninth aspect, refer to the technical effects of the communication method according to the first aspect to the third aspect. Details are not described herein again.

According to a tenth aspect, a chip system is provided. The chip system includes a processor and an input/output port. The processor is configured to implement the processing function in the communication methods according to the first aspect to the third aspect; and the input/output port is configured to implement the transceiver function in the communication methods according to the first aspect to the third aspect.

In a possible design, the chip system further includes a memory. The memory is configured to store program instructions and data for implementing a function of the communication methods according to the first aspect to the third aspect.

The chip system may include a chip, or may include the chip and another discrete component.

According to an eleventh aspect, a communication system is provided. The system includes one or more terminal devices and a network device.

According to a twelfth aspect, a computer-readable storage medium is provided. The computer-readable storage medium stores computer instructions. When the computer instructions are run on a computer, the computer is enabled to perform the communication method according to any possible implementation of the first aspect to the third aspect.

According to a thirteenth aspect, a computer program product is provided. The computer program product includes a computer program or instructions. When the computer program is run or the instructions are run on a computer, the computer is enabled to perform the communication method according to any possible implementation of the first aspect to the third aspect.

DETAILED DESCRIPTION OF ILLUSTRATIVE EMBODIMENTS

Figure 1:
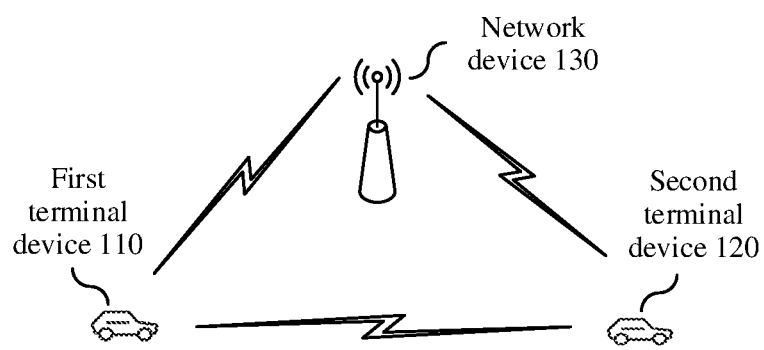
FIG. 1 is a schematic diagram of an architecture of a communication system according to an embodiment of this application.

The following describes the technical solutions in this application with reference to the accompanying drawings.

The technical solutions in the embodiments of this application may be applied to various communication systems, such as an orthogonal frequency division multiple access (OFDMA) system, a single carrier frequency division multiple access (SC-FDMA) system, and other systems. The terms "system" and "network" can be interchanged with each other. The OFDMA system may implement wireless technologies such as evolved universal terrestrial radio access (E-UTRA) and ultra mobile broadband (UMB). The E-UTRA is an evolved release of a universal mobile telecommunications system (UMTS). A new E-UTRA version is used in LTE and various versions evolved based on LTE in the 3rd generation partnership project (3GPP). A 5G communication system is a next-generation communication system under research, and may also be referred to as an NR system. The 5G communication system includes a 5G non-standalone (NSA) mobile communication system, a 5G standalone (SA) mobile communication system, or both a 5G NSA mobile communication system and a 5G SA mobile communication system. In addition, the communication systems may further be usable in a future-oriented communication technology, and are all usable in the technical solutions provided in the embodiments of this application. The foregoing communication systems usable in this application are merely examples for description, and a communication system usable in this application is not limited thereto. A general description is provided herein, and details are not described below again.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of the solutions may further be used.

In addition, in the embodiments of this application, the terms such as "for example" and "such as" are used to represent giving an example, an illustration, or a description. Any embodiment or design solution described as an "example" in this application should not be explained as being more preferred or having more advantages than another embodiment or design solution. Exactly, the term "example" is used to present a concept in a specific manner.

In the embodiments of this application, the terms "information", "signal", "message", "channel", and "signaling" may be interchangeably used sometimes. It should be noted that meanings expressed by the terms are consistent when differences between the terms are not emphasized. In addition, the terms "of", "relevant", and "corresponding" may be interchangeably used sometimes. It should be noted that meanings expressed by the terms are consistent when differences between the terms are not emphasized.

In the embodiments of this application, sometimes a subscript such as W1 may be written in an incorrect form such as W1. Expressed meanings are consistent when differences between them are not emphasized.

A network architecture and a service scenario that are described in the embodiments of this application are intended to describe the technical solutions in the embodiments of this application more clearly, and do not constitute any limitation on the technical solutions provided in the embodiments of this application. A person of ordinary skill in the art may know that, with evolution of the network architecture and emergence of a new service scenario, the technical solutions provided in the embodiments of this application are also applicable to a similar technical problem.

Some scenarios in the embodiments of this application are described by using a scenario in a communication system shown in FIG. 1 as an example. It should be noted that the solutions in the embodiments of this application may further be used in another mobile communication system, and a corresponding name may also be replaced with a name of a corresponding function in the another mobile communication system.

For ease of understanding of the embodiments of this application, first, a communication system usable in the embodiments of this application is described in detail by using the communication system shown in FIG. 1 as an example. FIG. 1 is a schematic diagram of an architecture of a communication system to which a communication method according to an embodiment of this application is applicable. As shown in FIG. 1, the communication system includes one or more terminal devices, such as a first terminal device 110 and a second terminal device 120, and one or more network devices, such as a network device 130.

The terminal device and the network device may communicate with each other through a Uu interface on an uplink (uplink, UL) and/or a downlink (downlink, DL). On the UL, the terminal device is a sender, and the network device is a receiver. On the DL, the network device is a sender, and the terminal device is a receiver.

It should be understood that the foregoing different terminal devices may alternatively communicate with each other through a PC5 interface over a sidelink (SL). On the SL, a terminal device is a sender, and another terminal device or other terminal devices is/are a receiver/receivers.

In some communication scenarios, one terminal device may need to simultaneously communicate with a network device and another terminal device. For example, as shown in FIG. 1, the first terminal device 110 needs to send data to the network device 130 and the second terminal device 120. To be specific, the first terminal device 110 has the following to-be-sent data: data that needs to be sent to the network device 130 on the UL, for example, a UL SR, an SL SR, a UL MAC control element (MAC CE) and a UL MAC service data unit (SDU) that may be carried in a UL MAC packet data unit (PDU), or a logical channel (LCH); and data that needs to be sent to the second terminal device 120 on the SL, for example, an SL MAC SDU that may be carried in an SL MAC PDU, or a sidelink logical channel (SL LCH).

It should be understood that both a UL and an SL may include a plurality of standards such as LTE and NR. When the following specific comparison between a UL and an SL and between SLs is performed, specific standards are not limited. For example, the comparison may be performed between an NR UL and an NR SL, or may be performed between an NR UL and an LTE SL, or may be performed between an LTE UL and an NR SL. For example, for a same interface, the comparison between the SLs is limited to comparison between an NR SL and an LTE SL.

It is easy to understand that, for the first terminal device 110, when air interface resources of the UL and the SL conflict, the first terminal device 110 needs to determine sending priorities of the UL and the SL. For example, in the existing LTE V2X protocol, a terminal device determines, based only on whether a value of a prose per-packet priority (PPPP) included in a UL MAC PDU is less than a specified PPPP threshold, whether to preferentially perform SL transmission or UL transmission, without considering that a service having a higher priority may also exist on the UL, for example, a UL MAC control element (CE), an ultra-reliable low-latency communication (URLLC) service, or a scheduling request (SR). As a result, the sending priorities of the UL and the SL are determined based on only a priority of the SL MAC PDU, causing a problem that UL transmission cannot be preferentially performed even though a service having a higher priority exists in the UL. Similarly, new radio (NR) V2X also has the foregoing problem.

In a possible design solution, a terminal device needs to send a UL MAC PDU to a network device, and send an SL MAC PDU to another terminal device, and a UL conflicts with an SL. Correspondingly, the terminal device obtains first configuration information. For example, the first configuration information includes indication information of an uplink medium access control control element UL MAC CE. Then, the terminal device preferentially sends the uplink medium access control packet data unit UL MAC PDU or the sidelink medium access control packet data unit SL MAC PDU based on the indication information. For example, the UL MAC PDU can be used to transmit the UL MAC CE. Based on this solution, the terminal device can obtain the first configuration information, determine, based on the indication information of the UL MAC CE in the first configuration information, whether the UL MAC PDU includes the specified UL MAC CE, and then preferentially send the UL MAC PDU or the SL MAC PDU based on a determining result. In other words, the terminal device may determine whether the UL MAC PDU includes the specified UL MAC CE, and determine sending priorities of the UL and the SL, to ensure that data transmitted on a link having a higher sending priority is preferentially transmitted. In this way, a problem that UL transmission cannot be preferentially performed even though a service having a higher priority, such as a URLLC service, exists on the UL and that is caused because the sending priorities of the UL and the SL are determined based on only a priority of the SL MAC PDU can be resolved, so that actual communication requirements on the two links, namely, the UL and the SL, can be comprehensively considered, thereby improving overall communication efficiency of the terminal device.

It should be noted that the "specified UL MAC CE" may be implemented by one or more of the following: a UL MAC CE pre-configured by the network device, a UL MAC CE dynamically configured by the network device by using signaling, or a UL MAC CE predefined in a protocol and written into an internal buffer of the terminal device during manufacturing or network access of the terminal device. A specific implementation of the "specified UL MAC CE" is not specifically limited in this application.

In another possible design solution, a terminal device needs to send an SR, for example, an SL SR and/or a UL SR to a network device, and send an SL MAC PDU to another terminal device, and a UL conflicts with an SL. Correspondingly, the terminal device receives second configuration information from the network device. For example, the second configuration information includes a first mapping relationship and/or a second mapping relationship used by the terminal device to compare a priority of a logical channel that triggers a scheduling request SR with a priority of a sidelink logical channel included in a sidelink medium access control packet data unit SL MAC PDU. Then, the terminal device preferentially sends the SR or the SL MAC PDU based on a priority comparison result. Based on this solution, the terminal device receives the second configuration information from the network device, compares, based on the first mapping relationship or the second mapping relationship in the second configuration information, the priority of the logical channel that triggers the SR on the UL with the priority of the sidelink logical channel included in the SL MAC PDU, and preferentially sends the SR on the UL or the SL MAC PDU based on the priority comparison result. In other words, the terminal device may compare priorities of to-be-transmitted data, such as the SR and the SL MAC PDU, on two links, namely, the UL and an SL, and comprehensively determine sending priorities of the UL and the SL based on a priority comparison result, to ensure that data transmitted on a link having a higher sending priority is preferentially transmitted. In this way, a problem that UL transmission cannot be preferentially performed even though a service having a higher priority, such as an SR triggered by a URLLC service, exists on the UL and that is caused because the sending priorities of the UL and the SL are determined based on only a priority of the SL MAC PDU can be resolved, so that actual communication requirements on the two links, namely, the UL and the SL, can be comprehensively considered, thereby improving overall communication efficiency of the terminal device.

It should be noted that specific implementations of the foregoing two design solutions are to be described in detail in subsequent method embodiments. Details are not described herein.

Optionally, the network device is a device that is located on a network side of the communication system and that has a wireless transceiver function, or a chip or a chip system that may be disposed in the device. The network device includes but is not limited to: an access point (AP) in a wireless fidelity (Wi-Fi) system, such as a home gateway, a router, a server, a switch, or a bridge, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a wireless relay node, a wireless backhaul node, a transmission point (transmission and reception point (TRP); or transmission point (TP)), or the like. The network device may alternatively be a gNB or a transmission point (TRP or TP) in a 5G system, for example, an NR system, or one antenna panel or a group of antenna panels (including a plurality of antenna panels) of a base station in a 5G system. The network device may alternatively be a network node, such as a baseband unit (BBU), a distributed unit (DU), or a road side unit (RSU) having a base station function, that constitutes a gNB or a transmission point.

Optionally, the terminal device may be a vehicle, an in-vehicle communication apparatus or an in-vehicle terminal that is installed on a vehicle and that is configured to assist in driving of the vehicle, or a chip in the in-vehicle communication apparatus or the in-vehicle terminal. The in-vehicle terminal may be a device configured to implement a wireless communication function, for example, a terminal or a chip that may be used in the terminal. The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved PLMN. An access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. The in-vehicle terminal may be movable or fixed.

It should be understood that FIG. 1 is merely an example of a simplified schematic diagram for ease of understanding. The communication system may further include another network device and/or another terminal device that are/is not shown in FIG. 1.

Optionally, the network device and the terminal device in the embodiments of this application may also be referred to as communication apparatuses. The communication apparatus may be a general-purpose device or a special-purpose device. This is not specifically limited in the embodiments of this application.

Figure 2:
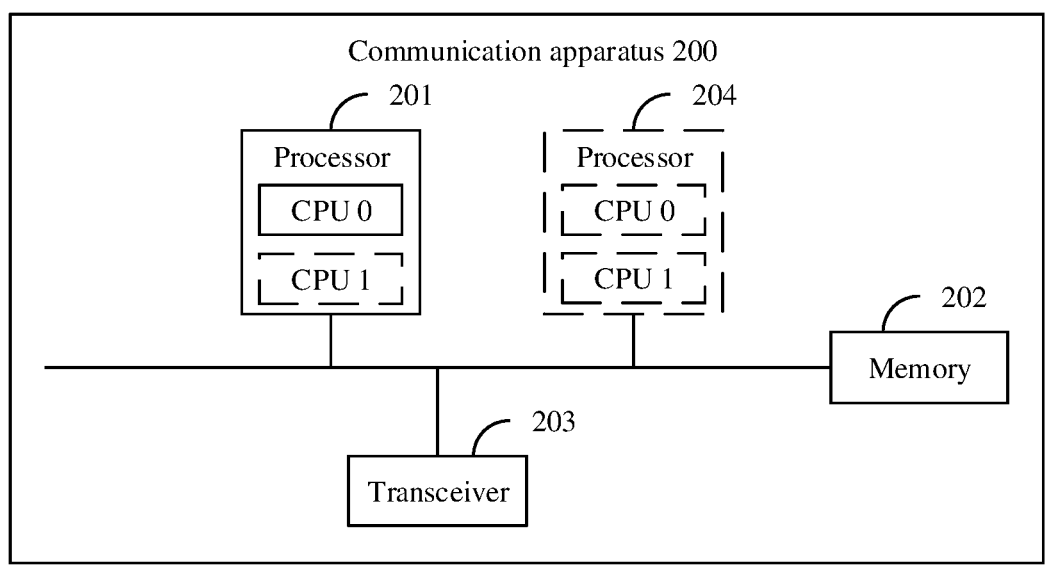
FIG. 2 is a first schematic diagram of a structure of a communication apparatus according to an embodiment of this application.

FIG. 2 is a schematic diagram of a structure of a communication apparatus 200 according to an embodiment of this application. As shown in FIG. 2, the communication apparatus 200 may be a terminal device or a network device, or may be a chip used in the terminal device or the network device, or another component, module, subsystem, or the like that has a terminal function or a network device function. As shown in FIG. 2, the communication apparatus 200 may include a processor 201, a memory 202, and a transceiver 203. There is a signal connection between the processor 201, the memory 202, and the transceiver 203. For example, the processor 201, the memory 202, and the transceiver 203 may be connected through a communication bus.

The following describes each component of the communication apparatus 200 in detail with reference to FIG. 2.

The processor 201 is a control center of the communication apparatus 200, and may be one processor or may be a collective term of a plurality of processing elements. For example, the processor 201 is one or more central processing units (CPUs), or may be an application-specific integrated circuit (ASIC), or is configured as one or more integrated circuits implementing the embodiments of this application, for example, one or more digital signal processors (DSPs), or one or more field programmable gate arrays (FPGAs).

The processor 201 may perform various functions of the communication apparatus 200 by running or executing a software program stored in the memory 202 and invoking data stored in the memory 202.

During specific implementation, in an embodiment, the processor 201 may include one or more CPUs, for example, a CPU 0 and a CPU 1 shown in FIG. 2.

During specific implementation, in an embodiment, the communication apparatus 200 may alternatively include a plurality of processors, for example, the processor 201 and a processor 204 shown in FIG. 2. Each of the processors may be a single-core (single-CPU) processor or may be a multi-core (multi-CPU) processor. The processor herein may be one or more communication devices, circuits, and/or processing cores configured to process data (for example, computer program instructions).

The memory 202 may be a read-only memory (ROM) or another type of static storage communication device that can store static information and instructions, or a random access memory (RAM) or another type of dynamic storage communication device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in a form of an instruction or a data structure and that can be accessed by a computer. However, the memory 202 is not limited thereto. The memory 202 may exist independently, or may be integrated with the processor 201.

The memory 202 is configured to store a software program for performing the solutions of this application, and the processor 201 controls execution of the software program. For the foregoing specific implementations, refer to the following method embodiments. Details are not described herein again.

The transceiver 203 is used by the communication apparatus 200 to communicate with another communication apparatus. The transceiver 203 may include a receiving unit for implementing a receiving function and a sending unit for implementing a sending function.

It should be noted that the structure of the communication apparatus 200 shown in FIG. 2 does not constitute a limitation on the communication apparatus. An actual communication apparatus may include more or fewer components than those shown in FIG. 2, or some components may be combined, or a different component arrangement may be used.

Figure 3:
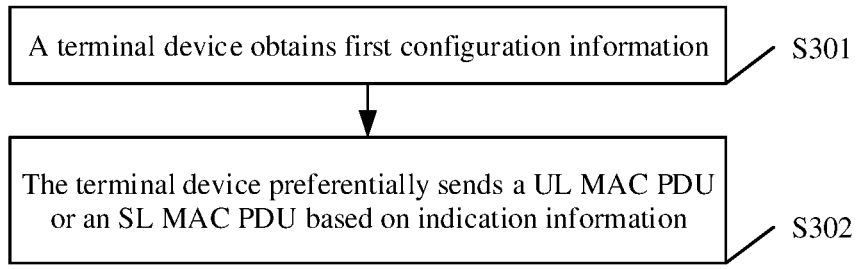
FIG. 3 is a first schematic flowchart of a communication method according to an embodiment of this application.
Figure 4:
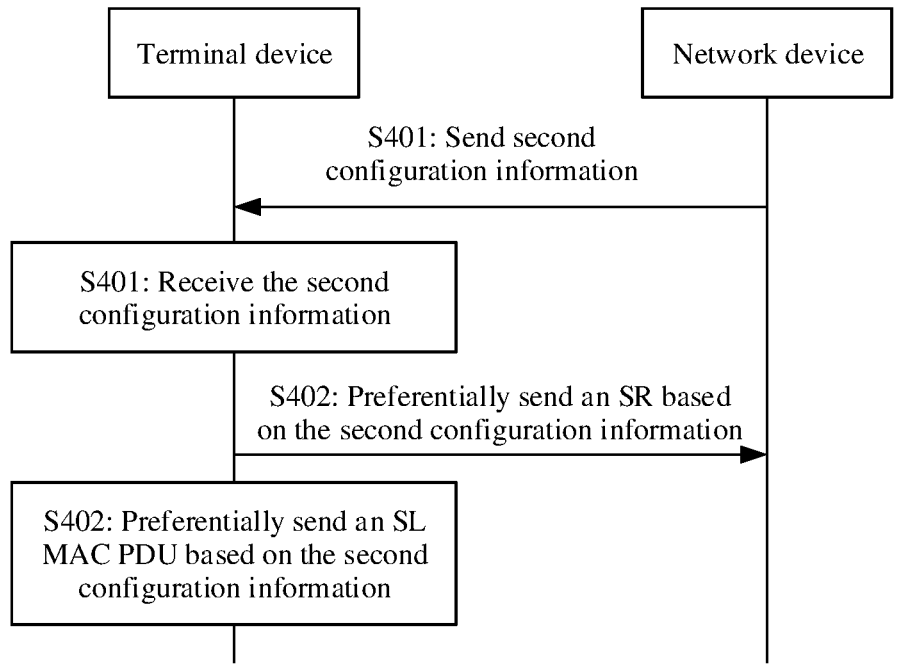
FIG. 4 is a second schematic flowchart of a communication method according to an embodiment of this application.
Figure 5:
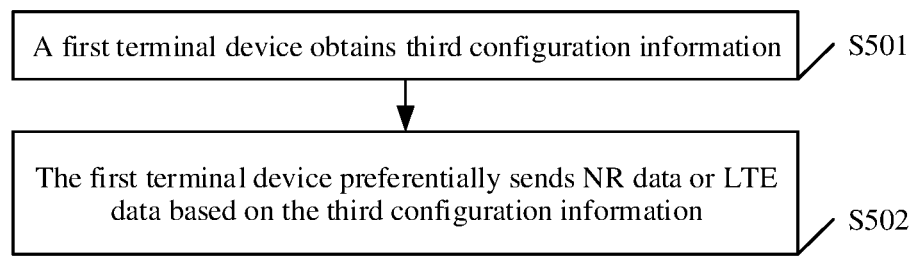
FIG. 5 is a third schematic flowchart of a communication method according to an embodiment of this application.

The following describes in detail the communication method provided in the embodiments of this application with reference to FIG. 3 to FIG. 5.

FIG. 3 is a first schematic flowchart of a communication method according to an embodiment of this application. The communication method is applicable to a scenario, of simultaneous communication between a terminal device, a network device, and another terminal device, shown in FIG. 1.

As shown in FIG. 3, the communication method includes the following steps.

S301: A terminal device obtains first configuration information.

For example, the first configuration information includes indication information of an uplink medium access control control element UL MAC CE.

For example, the UL MAC CE may include one or more of the following: a cell radio network temporary identifier (C-RNTI) MAC CE, a configured grant confirmation MAC CE, a MAC CE for a link buffer status report BSR with exception of a BSR included for padding (MAC CE for BSR, with exception of BSR included for padding), a MAC CE for a BSR included for padding (MAC CE for BSR included for padding), a MAC CE for a sidelink buffer status report SL BSR with exception of an SL BSR included for padding (MAC CE for SL BSR, with exception of SL BSR included for padding), a MAC CE for an SL BSR included for padding (MAC CE for SL BSR included for padding), a single-entry or multiple-entry power headroom report (PHR) MAC CE, and a MAC CE for a recommended bit rate queue (MAC CE for recommended bit rate queue). Correspondingly, the indication information of the UL MAC CE may include one or more of the following information that can be used to identify the UL MAC CE: a name, an identifier, a type of the UL MAC CE, and other indication information. It is easy to understand that types of indication information of different UL MAC CEs may be the same or different. The type of the corresponding indication information in this embodiment of this application is not specifically limited.

Optionally, the UL MAC CE may further include one or more of the following: an uplink buffer status report UL BSR MAC CE corresponding to a specified logical channel, a sidelink buffer status report SL BSR MAC CE corresponding to a specified sidelink logical channel, a UL BSR MAC CE corresponding to a specified service, and an SL BSR MAC CE corresponding to a specified service. The specified logical channel or the specified sidelink logical channel may be determined by using a logical channel priority or a sidelink logical channel priority. For example, logical channel priorities 0, 1, and 2 are specified. When a highest priority of a corresponding logical channel that triggers the UL BSR MAC CE falls within a list of 0, 1, and 2, the UL BSR MAC CE belongs to the specified UL MAC CE.

Further, optionally, the different UL MAC CEs may be alternatively configured based on a highest priority of one or more sidelink logical channels included in an SL MAC PDU. For example, a UL MAC CE specified for a highest priority 0 of the sidelink logical channel included in the SL MAC PDU and a UL MAC CE specified for a highest priority 3 of the sidelink logical channel included in the SL MAC PDU may be different or not identical.

In a possible design method, that a terminal device obtains first configuration information may include: The terminal device receives the first configuration information from a network device; or the terminal device obtains the first configuration information from a local buffer.

For example, that the terminal device receives the first configuration information from a network device may include: The terminal device may receive and parse downlink signaling that is from the network device and that carries the first configuration information, to obtain the first configuration information. For example, the downlink signaling may be radio resource control (RRC) signaling, broadcast, system information, a physical downlink control channel (PDCCH), or the like. This is not limited in this embodiment of this application.

Optionally, the terminal device may alternatively receive the first configuration information pre-configured by the network device. For example, the terminal device may receive, in a registration process, the first configuration information pre-configured by the network device.

For example, that the terminal device obtains the first configuration information from a local buffer may include: The terminal device may read, from the local buffer of the terminal device, the first configuration information obtained and stored before. For example, the locally buffered first configuration information may be the first configuration information received by using the foregoing downlink signaling or in the pre-configuration manner, or is predefined in a protocol (fixed in the specification) and written into the local buffer of the terminal device in advance in a manufacturing process of the terminal device or when a user performs a network access procedure. A manner of initially obtaining the first configuration information stored in the local buffer of the terminal device is not limited in this embodiment of this application.

S302: The terminal device preferentially sends an uplink medium access control packet data unit UL MAC PDU or a sidelink medium access control packet data unit SL MAC PDU based on the indication information.

For example, the UL MAC PDU can be used to transmit the UL MAC CE. In addition, the UL MAC PDU may further include the following data: a UL MAC CE other than the UL MAC CE specified in the first configuration information, a UL MAC SDU used to carry to-be-transmitted data, a logical channel used to carry to-be-transmitted data, and/or the like. For example, the UL MAC CE specified in the first configuration information and another UL MAC CE that is not indicated by the first configuration information may correspond to a logical channel on a UL, or may correspond to a sidelink logical channel on an SL. This is not limited in this embodiment of this application. Different from the UL MAC PDU, the SL MAC PDU is usually used to transmit an SL MAC SDU and/or a sidelink logical channel.

It should be noted that, in this embodiment of this application, if the UL MAC PDU includes the UL MAC CE specified in the first configuration information, it may be considered that a sending priority of the UL is higher than a sending priority of the SL. Therefore, in a possible design method, when the UL conflicts with the SL, that the terminal device preferentially sends an uplink medium access control packet data unit UL MAC PDU or a sidelink medium access control packet data unit SL MAC PDU based on the indication information in S302 may include: If the UL MAC PDU includes the specified UL MAC CE, the terminal device preferentially sends the UL MAC PDU.

Specifically, that the terminal device preferentially sends the UL MAC PDU may include one of the following: The terminal device sends the UL MAC PDU, and skips sending the SL MAC PDU, that is, the terminal device abandons SL transmission to ensure UL transmission; the terminal device sends the UL MAC PDU and the SL MAC PDU, and reduces a transmit power of the SL MAC PDU; or the terminal device sends the UL MAC PDU and the SL MAC PDU, and increases a transmit power of the UL MAC PDU.

It should be noted that "reducing the transmit power of the SL MAC PDU" and "increasing the transmit power of the UL MAC PDU" may use a previous transmit power on the link as a reference, or may use a transmit power on another link as a reference. Using "increasing the transmit power of the UL MAC PDU" as an example, the transmit power of the current UL MAC PDU may be greater than a transmit power of a previously sent UL MAC PDU, or may be greater than a transmit power of the SL MAC PDU.

Further, that the terminal device sends the UL MAC PDU, and skips sending the SL MAC PDU may include: The terminal device sends the UL MAC PDU, and skips sending the SL MAC PDU, if the UL MAC PDU and the SL MAC PDU overlap in time domain.

For example, "the UL MAC PDU and the SL MAC PDU overlap in time domain" means that a non-empty intersection exists between a time domain resource occupied by the UL MAC PDU and a time domain resource occupied by the SL MAC PDU. For example, both the time domain resource occupied by the UL MAC PDU and the time domain resource occupied by the SL MAC PDU include a same subframe, a same slot, a same symbol, or a same short slot (short slot, also referred to as a mini-slot).

For example, that the terminal device sends the UL MAC PDU, and skips sending the SL MAC PDU, if the UL MAC PDU and the SL MAC PDU overlap in time domain may include one of the following: If the UL MAC PDU and the SL MAC PDU overlap in time domain and use a same transmit frequency, the terminal device sends the UL MAC PDU, and skips sending the SL MAC PDU; or if the UL MAC PDU and the SL MAC PDU overlap in time domain and use different transmit frequencies, the terminal device sends the UL MAC PDU, and skips sending the SL MAC PDU.

Further, that the terminal device sends the UL MAC PDU and the SL MAC PDU, and reduces a transmit power of the SL MAC PDU may include: If the UL MAC PDU and the SL MAC PDU overlap in time domain and use different transmit frequencies, the terminal device sends the UL MAC PDU and the SL MAC PDU, and reduces the transmit power of the SL MAC PDU.

Further, that the terminal device sends the UL MAC PDU and the SL MAC PDU, and increases a transmit power of the UL MAC PDU may include: If the UL MAC PDU and the SL MAC PDU overlap in time domain and use different transmit frequencies, the terminal device sends the UL MAC PDU and the SL MAC PDU, and increases the transmit power of the UL MAC PDU.

It should be noted that, in a scenario in which the UL MAC PDU does not include the UL MAC CE specified in the first configuration information, the terminal device further needs to preferentially perform SL transmission or UL transmission based on a result of comparing a priority of the logical channel on the UL with a priority of the sidelink logical channel on the SL. To be specific, this embodiment of this application may further include the following technical solutions.

In a possible design method, that the terminal device preferentially sends an uplink medium access control packet data unit UL MAC PDU or a sidelink medium access control packet data unit SL MAC PDU based on the indication information in S302 may include:

If the UL MAC PDU and the SL MAC PDU satisfy a first condition, the terminal device preferentially sends the SL MAC PDU. For example, the first condition may be that the UL MAC PDU does not include random access data, for example, a random access channel (random access channel, RACH), the UL MAC PDU does not include emergency call data (where the emergency call or a PUSCH for an emergency PDU connection, such as an alarm call, can be configured by an upper layer), the UL MAC PDU does not include the UL MAC CE, and a priority of the UL MAC PDU is lower than or equal to a priority of the SL MAC PDU. For example, the priority of the UL MAC PDU may be a highest priority of one or more logical channels included in the UL MAC PDU, and the priority of the SL MAC PDU may be a highest priority of one or more sidelink logical channels included in the SL MAC PDU.

Alternatively, in another possible design method, that the terminal device preferentially sends an uplink medium access control packet data unit UL MAC PDU or a sidelink medium access control packet data unit SL MAC PDU based on the indication information in S302 may include:

If the UL MAC PDU and the SL MAC PDU satisfy a second condition, the terminal device preferentially sends the SL MAC PDU. For example, the second condition may be that the UL MAC PDU does not include random access data, the UL MAC PDU does not include emergency call data, and a priority of the UL MAC PDU is lower than or equal to a priority of the SL MAC PDU. For example, the priority of the UL MAC PDU may be a highest priority of one or more logical channels included in the UL MAC PDU, and the priority of the SL MAC PDU may be a highest priority of one or more sidelink logical channels included in the SL MAC PDU.

The priority of the logical channel or the sidelink logical channel may be determined based on an actual communication requirement of a service carried on the logical channel, for example, determined based on a transmission reliability requirement and a transmission latency requirement. For example, both a reliability requirement and a transmission latency requirement of a URLLC service are higher than those of an enhanced mobile broadband (eMBB) service. Therefore, a priority of a logical channel carrying the URLLC service is higher than a priority of a logical channel carrying the eMBB service.

Optionally, if the priority of the logical channel on the UL and the priority of the sidelink logical channel on the SL use a same priority representation manner and include a same priority level, the priorities of the logical channels on the two links may be directly compared.

However, if the priority of the logical channel on the UL and the priority of the sidelink logical channel on the SL respectively use different priority representation manners, and/or include different priority levels, the priorities of the logical channels on the two links cannot be directly compared. Therefore, optionally, a mapping relationship between the priorities of the logical channels on the two links may be defined, and the priority of the logical channel on one of the links is converted, based on the mapping relationship, into a mapping priority that can be compared with the priority of the logical channel on the other link. Then, the mapping priority is compared with the priority of the logical channel on the other link, to obtain a result of comparing the priority of the logical channel on one link with the priority of the logical channel on the other link. For example, the terminal device may obtain the mapping relationship by using RRC signaling, a system information block (SIB), a MAC CE, downlink control information (DCI) from the network device or in a pre-configuration manner.

TABLE 1

| Priority of the logical channel on the UL | Mapping priority of the priority of the logical channel on the UL | Priority of the sidelink logical channel on the SL |
| --- | --- | --- |
| 0 |  | 0 |
| 1 | 0 | 1 |
| 2 | 1 | 2 |
| 3 | 2 | 3 |
| 4 | 3 | 4 |
| 5 | 4 | 5 |
| 6 | 5 | 6 |
| 7 | 6 | 7 |
| 8 | 7 | 8 |
| 9 | 8 | 9 |
| 10 | 9 | 10 |
| 11 | 10 | 11 |
| 12 | 11 | 12 |
| 13 | 12 | 13 |
| 14 | 13 | 14 |
| 15 | 14 | 15 |

For example, Table 1 is a first table of a mapping relationship by using which the priority of the logical channel on the UL is converted into a mapping priority that can be compared with the priority of the sidelink logical channel on the SL. As shown in Table 1, the priorities of the logical channels on the UL and the SL cannot be directly compared, and priority levels are both 16. In other words, both the priorities of the logical channels on the two links are 16 levels, and a smaller value indicates a higher priority. To be specific, a logical channel whose priority value is 0 is a logical channel having a highest priority among all the logical channels on the same link, and a logical channel whose priority value is 15 is a logical channel having a lowest priority among all the logical channels on the same link. For example, assuming that values of the priority of the logical channel on the UL and the priority of the sidelink logical channel on the SL are both 2, based on Table 1, a value of the mapping priority that corresponds to the priority of the logical channel on the UL and that can be compared with the priority of the sidelink logical channel on the SL is 1, and is less than the value 2 of the priority of the sidelink logical channel on the SL. In this case, it may be determined that the priority 2 of the logical channel on the UL is higher than the priority 2 of the sidelink logical channel on the SL.

It should be noted that, when the value of the priority of the logical channel on the UL is 0, there is no mapping priority that corresponds to the priority of the logical channel on the UL and that can be compared with the priority of the sidelink logical channel on the SL in Table 1. It is easy to understand that, because the logical channel whose priority value is 0 on the UL is a logical channel having a highest priority among all the logical channels on the UL, the priority of the logical channel whose priority value is 0 on the UL is higher than priorities of all the sidelink logical channels on the SL.

Optionally, when the value of the mapping priority of the priority of the logical channel on the UL is the same as the priority of the sidelink logical channel on the SL, the priority of the logical channel on the UL is the same as the priority of the sidelink logical channel on the SL. In this case, whether the terminal device selects to preferentially perform UL transmission or SL transmission depends on a specific implementation of the terminal device. This is not limited in this embodiment of this application. For example, based on channel conditions of the two links, namely, the UL and the SL, the terminal device may preferentially perform transmission on a link having a better channel condition. For another example, the terminal device is an in-vehicle terminal and is in a high-speed driving state. For example, if a vehicle speed exceeds 120 kilometers per hour (kilometers per hour, km/h), the terminal device preferentially performs SL transmission; otherwise, the terminal device preferentially performs UL transmission.

TABLE 2

| Priority of the logical channel on the SL | Mapping priority of the priority of the sidelink logical channel on the SL | Priority of the logical channel on the UL |
|---|---|---|
| 0 | 1 | 0 |
| 1 | 2 | 1 |
| 2 | 3 | 2 |
| 3 | 4 | 3 |
| 4 | 5 | 4 |
| 5 | 6 | 5 |
| 6 | 7 | 6 |
| 7 | 8 | 7 |
| 8 | 9 | 8 |
| 9 | 10 | 9 |
| 10 | 11 | 10 |
| 11 | 12 | 11 |
| 12 | 13 | 12 |
| 13 | 14 | 13 |
| 14 | 15 | 14 |
| 15 |  | 15 |

For example, Table 2 is a first table of a mapping relationship by using which the priority of the logical channel on the SL is converted into a mapping priority that can be compared with the priority of the logical channel on the UL. As shown in Table 2, the priorities of the logical channels on the UL and the SL cannot be directly compared, and priority levels are both 16. In other words, both the priorities of the logical channels on the two links are 16 levels, and a smaller value indicates a higher priority. To be specific, a logical channel whose priority value is 0 is a logical channel having a highest priority among all the logical channels on the same link, and a logical channel whose priority value is 15 is a logical channel having a lowest priority among all the logical channels on the same link. For example, assuming that values of the priority of the sidelink logical channel on the SL and the priority of the logical channel on the UL are respectively 3 and 5, based on Table 2, a value of the mapping priority that corresponds to the priority of the sidelink logical channel on the SL and that can be compared with the priority of the logical channel on the UL is 4, and is less than the value 5 of the priority of the logical channel on the UL. In this case, it may be determined that the priority 3 of the sidelink logical channel on the SL is higher than the priority 5 of the logical channel on the UL.

It should be noted that, when the value of the priority of the sidelink logical channel on the SL is 15, there is no mapping priority that corresponds to the priority of the sidelink logical channel on the SL and that can be compared with the priority of the logical channel on the UL in Table 2. It is easy to understand that, because the sidelink logical channel whose priority value is 15 on the SL is a sidelink logical channel having a lowest priority among all the sidelink logical channels on the SL, a priority of the sidelink logical channel whose priority value is 15 on the SL is lower than priorities of all the logical channels on the UL.

TABLE 3

| Priority of the logical channel on the UL | Mapping priority of the priority of the logical channel on the UL | Priority of the sidelink logical channel on the SL |
|---|---|---|
| 0 | 0 | 0 |
| 1 |  |  |
| 2 | 1 | 1 |
| 3 |  |  |
| 4 | 2 | 2 |
| 5 |  |  |
| 6 | 3 | 3 |
| 7 |  |  |
| 8 | 4 | 4 |
| 9 |  |  |
| 10 | 5 | 5 |
| 11 |  |  |
| 12 | 6 | 6 |
| 13 |  |  |
| 14 | 7 | 7 |
| 15 |  |  |

For example, Table 3 is a second table of a mapping relationship by using which the priority of the logical channel on the UL is converted into a mapping priority that can be compared with the priority of the sidelink logical channel on the SL. As shown in Table 3, priority levels of the logical channels on the UL and the SL are respectively 16 and 8. In other words, the priority levels of the logical channel on the UL are twice the priority levels of the sidelink logical channel on the SL, and cannot be directly compared. In addition, for logical channels on a same link, a smaller priority value indicates a higher priority. To be specific, for the UL, a logical channel whose priority value is 0 is a logical channel having a highest priority among all the logical channels on the UL, and a logical channel whose priority value is 15 is a logical channel having a lowest priority among all the logical channels on the UL; for the SL, a sidelink logical channel whose priority value is 0 is a sidelink logical channel having a highest priority among all the sidelink logical channels on the SL, and a sidelink logical channel whose priority value is 7 is a sidelink logical channel having a lowest priority among all the sidelink logical channels on the SL. For example, assuming that values of the priority of the logical channel on the UL and the priority of the sidelink logical channel on the SL are both 2, based on Table 3, a value of the mapping priority that corresponds to the priority of the logical channel on the UL and that can be compared with the priority of the sidelink logical channel on the SL is 1, and is less than the value 2 of the priority of the sidelink logical channel on the SL. In this case, it may be determined that the priority 2 of the logical channel on the UL is higher than the priority 2 of the sidelink logical channel on the SL.

TABLE 4

| Priority of the sidelink logical channel on the SL | Mapping priority of the priority of the sidelink logical channel on the SL | Priority of the logical channel on the UL |
|---|---|---|
| 0 | 0 | 0 |
|  | 1 | 1 |
| 1 | 2 | 2 |
|  | 3 | 3 |
| 2 | 4 | 4 |
|  | 5 | 5 |

TABLE 4-continued

| Priority of the sidelink logical channel on the SL | Mapping priority of the priority of the sidelink logical channel on the SL | Priority of the logical channel on the UL |
|---|---|---|
| 3 | 6 | 6 |
|   | 7 | 7 |
| 4 | 8 | 8 |
|   | 9 | 9 |
| 5 | 10 | 10 |
|   | 11 | 11 |
| 6 | 12 | 12 |
|   | 13 | 13 |
| 7 | 14 | 14 |
|   | 15 | 15 |

For example, Table 4 is a second table of a mapping relationship by using which the priority of the sidelink logical channel on the SL is converted into a mapping priority that can be compared with the priority of the logical channel on the UL. As shown in Table 4, priority levels of the logical channels on the UL and the SL are respectively 8 and 16. In other words, the priority levels of the logical channel on the UL are twice the priority levels of the sidelink logical channel on the SL, and cannot be directly compared. In addition, for logical channels on a same link, a smaller priority value indicates a higher priority. To be specific, for the SL, a sidelink logical channel whose priority value is 0 is a sidelink logical channel having a highest priority among all the sidelink logical channels on the SL, and a sidelink logical channel whose priority value is 7 is a sidelink logical channel having a lowest priority among all the sidelink logical channels on the SL; for the UL, a logical channel whose priority value is 0 is a logical channel having a highest priority among all the logical channels on the UL, and a logical channel whose priority value is 15 is a logical channel having a lowest priority among all the logical channels on the UL. For example, assuming that values of the priority of the logical channel on the UL and the priority of the sidelink logical channel on the SL are both 2, and the mapping priority that corresponds to the priority of the logical channel on the UL and that can be compared with the priority of the sidelink logical channel on the SL is an even number, based on Table 4, a value of the mapping priority that corresponds to the priority of the sidelink logical channel on the SL and that can be compared with the priority of the logical channel on the UL is 4, and is greater than the value 2 of the priority of the logical channel on the UL. In this case, it may be determined that the priority 2 of the sidelink logical channel on the SL is lower than the priority 2 of the logical channel on the UL.

It should be noted that, as shown in Table 4, a priority of a same sidelink logical channel on an SL may correspond to two mapping priority values that can be compared with a priority of a logical channel on a UL, and a specific mapping priority value to be converted into may be determined depending on a specific implementation of the terminal device. For example, it may be determined, based on a priority mapping indication from the network device, whether the priority of the sidelink logical channel on the SL is converted into an even value or an odd value of the mapping priority. The terminal device may obtain the priority mapping indication by using RRC signaling, an SIB, a MAC CE, DCI, pre-configured signaling, or the like from the network device. Optionally, if the terminal device is an in-vehicle terminal and is in a driving state, when a vehicle speed exceeds a vehicle speed threshold, for example, the vehicle speed exceeds 90 km/h, the priority of the sidelink logical channel on the SL is converted into an even value of the mapping priority; otherwise, the priority of the sidelink logical channel on the SL is converted into an odd value.

Optionally, refer to Table 1 to Table 4, when the value of the mapping priority of the priority of the sidelink logical channel on the SL is the same as the priority of the logical channel on the UL, the priority of the sidelink logical channel on the SL is the same as the priority of the logical channel on the UL. In this case, whether the terminal device selects to preferentially perform SL transmission or UL transmission depends on a specific implementation of the terminal device. This is not limited in this embodiment of this application. For example, based on channel conditions of the two links, namely, the UL and the SL, the terminal device may preferentially perform transmission on a link having a better channel condition. For another example, it is assumed that the terminal device is an in-vehicle terminal and a vehicle is in a high-speed driving state. For example, if a vehicle speed exceeds 120 km/h, the terminal device preferentially performs SL transmission; otherwise, the terminal device preferentially performs UL transmission.

In this embodiment of this application, when there are a plurality of logical channels on the UL and/or the SL, only a highest priority of the one or more logical channels on the UL needs to be compared with a highest priority of the one or more sidelink logical channels on the SL. For example, there is only a logical channel A on the UL, there are two sidelink logical channels, namely, a sidelink logical channel 1 and a sidelink logical channel 2, on the SL, and a priority of the sidelink logical channel 2 is higher than that of the sidelink logical channel 1. In this case, only the logical channel A needs to be compared with the sidelink logical channel 2. For another example, a logical channel A and a logical channel B exist on the UL, and a priority of the logical channel A is higher than that of the logical channel B, and there are three sidelink logical channels, namely, a sidelink logical channel 1, a sidelink logical channel 2, and a sidelink logical channel 3, on the SL. In addition, a priority of the sidelink logical channel 1 is higher than priorities of the sidelink logical channel 2 and the sidelink logical channel 3. In this case, only the logical channel A needs to be compared with the sidelink logical channel 1.

Optionally, when the priority of the logical channel does not exist on the UL, for example, when the UL MAC PDU includes only the UL MAC CE, based on a comparison between the highest priority of the logical channel in the UL MAC PDU and the highest priority of the sidelink logical channel in the SL MAC PDU, it may be understood that the highest priority of the logical channel on the UL is always lower than the highest priority of the sidelink logical channel on the SL. In this way, it is determined that the SL MAC PDU is preferentially sent. Optionally, it may alternatively be understood that the highest priority of the logical channel on the UL is always higher than the highest priority of the sidelink logical channel on the SL. In this way, it is determined that the SL MAC PDU is preferentially sent.

Specifically, that the terminal device preferentially sends the SL MAC PDU may include one of the following.

The terminal device sends the SL MAC PDU, and skips sending the UL MAC PDU; the terminal device sends the UL MAC PDU and the SL MAC PDU, and reduces a transmit power of the UL MAC PDU; or the terminal device sends the UL MAC PDU and the SL MAC PDU, and increases a transmit power of the SL MAC PDU.

Further, that the terminal device sends the SL MAC PDU, and skips sending the UL MAC PDU may include: The terminal device sends the SL MAC PDU, and skips sending the UL MAC PDU, if the UL MAC PDU and the SL MAC PDU overlap in time domain.

For example, that the terminal device sends the SL MAC PDU, and skips sending the UL MAC PDU, if the UL MAC PDU and the SL MAC PDU overlap in time domain may include: If the UL MAC PDU and the SL MAC PDU overlap in time domain and use a same transmit frequency, the terminal device sends the SL MAC PDU, and skips sending the UL MAC PDU; or if the UL MAC PDU and the SL MAC PDU overlap in time domain and use different transmit frequencies, the terminal device sends the SL MAC PDU, and skips sending the UL MAC PDU.

Further, that the terminal device sends the UL MAC PDU and the SL MAC PDU, and reduces a transmit power of the UL MAC PDU may include: If the UL MAC PDU and the SL MAC PDU overlap in time domain and use different transmit frequencies, the terminal device sends the UL MAC PDU and the SL MAC PDU, and reduces the transmit power of the UL MAC PDU.

Further, that the terminal device sends the UL MAC PDU and the SL MAC PDU, and increases a transmit power of the SL MAC PDU may include: If the UL MAC PDU and the SL MAC PDU overlap in time domain and use different transmit frequencies, the terminal device sends the UL MAC PDU and the SL MAC PDU, and increases the transmit power of the SL MAC PDU.

In addition, when determining the foregoing preferential sending solution, the terminal device may further deliver a data transmission indication to a lower layer, for example, a physical layer (PHY). For example, the data transmission indication is used to indicate the physical layer to preferentially send data on an uplink shared channel (UL-SCH), or to preferentially map data on a sidelink shared channel (SL-SCH).

The following uses an example to describe an execution procedure of S302.

Step 1: The terminal device determines whether the UL MAC PDU includes the UL MAC CE specified in the first configuration information. For example, the UL MAC CE configured in the first configuration information may correspond to a UL logical channel, or may correspond to an SL sidelink logical channel. It should be understood that, in addition to the UL MAC CE specified in the first configuration information, the UL MAC PDU may further include a UL MAC CE not specified in the first configuration information, a UL MAC SDU used to carry to-be-transmitted data, a logical channel used to carry to-be-transmitted data, and/or the like.

Step 2: If the UL MAC PDU includes the UL MAC CE specified in the first configuration information, the terminal device preferentially performs UL transmission; or if the UL MAC PDU does not include the UL MAC CE specified in the first configuration information, step 3 continues to be performed.

Step 3: The terminal device determines whether the UL MAC PDU and the SL MAC PDU satisfy the first condition, or determines whether the UL MAC PDU and the SL MAC PDU satisfy the second condition.

Step 4: If the UL MAC PDU and the SL MAC PDU satisfy the first condition, or the UL MAC PDU and the SL MAC PDU satisfy the second condition, the terminal device preferentially performs SL transmission; otherwise, the terminal device preferentially performs UL transmission.

For technical effects of the communication method shown in FIG. 3, refer to the technical effects of the communication system shown in FIG. 1. Details are not described herein again.

FIG. 4 is a second schematic flowchart of a communication method according to an embodiment of this application. The communication method is applicable to a scenario, of simultaneous communication between a terminal device, a network device, and another terminal device, shown in FIG. 1. As shown in FIG. 4, the communication method includes the following steps.

S401: A network device sends second configuration information to a terminal device. Correspondingly, the terminal device receives the second configuration information from the network device.

For example, the network device may send the second configuration information to the terminal device by using RRC signaling, a system information block SIB, a MAC CE, DCI, or pre-configured signaling.

For example, the second configuration information includes a first mapping relationship and/or a second mapping relationship used by the terminal device to compare a priority of a logical channel that triggers a scheduling request SR with a priority of a sidelink logical channel included in a sidelink medium access control packet data unit SL MAC PDU. For example, the SR may include a UL SR used to request the network device to allocate an air interface resource on a UL to the terminal device, and/or an SL SR used to request the network device to allocate an air interface resource on an SL to the terminal device. Correspondingly, the first mapping relationship is used to convert the priority of the logical channel that triggers the scheduling request SR into a mapping priority that can be compared with the priority of the sidelink logical channel included in the sidelink medium access control packet data unit SL MAC PDU. The second mapping relationship is used to convert the priority of the sidelink logical channel included in the SL MAC PDU into a mapping priority that can be compared with the priority of the logical channel that triggers the SR.

S402: The terminal device preferentially sends the SR or the SL MAC PDU based on the second configuration information.

The following describes in detail, by using specific examples of the first mapping relationship and the second mapping relationship, various optional solutions in which the terminal device compares a priority of a logical channel that triggers the UL SR and the priority of the sidelink logical channel included in the SL MAC PDU.

TABLE 5

| Priority of the logical channel that triggers the UL SR | Mapping priority of the priority of the logical channel that triggers the UL SR | Priority of the sidelink logical channel included in the SL MAC PDU |
| --- | --- | --- |
| 0 | | 0 |
| 1 | 0 | 1 |
| 2 | 1 | 2 |
| 3 | 2 | 3 |
| 4 | 3 | 4 |
| 5 | 4 | 5 |
| 6 | 5 | 6 |
| 7 | 6 | 7 |
| 8 | 7 | 8 |
| 9 | 8 | 9 |
| 10 | 9 | 10 |

TABLE 5-continued

| Priority of the logical channel that triggers the UL SR | Mapping priority of the priority of the logical channel that triggers the UL SR | Priority of the sidelink logical channel included in the SL MAC PDU |
|---|---|---|
| 11 | 10 | 11 |
| 12 | 11 | 12 |
| 13 | 12 | 13 |
| 14 | 13 | 14 |
| 15 | 14 | 15 |

For example, Table 5 is an example 1 of the first mapping relationship, and the first mapping relationship is used to convert the priority of the logical channel that triggers the UL SR into the mapping priority that can be compared with the priority of the sidelink logical channel included in the SL MAC PDU. As shown in Table 5, the priority of the logical channel that triggers the UL SR and the priority of the sidelink logical channel included in the SL MAC PDU cannot be directly compared, and priority levels are both 16. In other words, both the priorities of the logical channels on the two links are 16 levels, and a smaller value indicates a higher priority. To be specific, a logical channel whose priority value is 0 is a logical channel having a highest priority among all the logical channels on the same link, and a logical channel whose priority value is 15 is a logical channel having a lowest priority among all the logical channels on the same link. For example, assuming that values of the priority of the logical channel that triggers the UL SR and the priority of the sidelink logical channel included in the SL MAC PDU are both 2, based on Table 5, a value of the mapping priority that corresponds to the priority of the logical channel that triggers the UL SR and that can be compared with the priority of the sidelink logical channel included in the SL MAC PDU is 1, and is less than the value 2 of the priority of the sidelink logical channel included in the SL MAC PDU. In this case, it may be determined that the priority 2 of the logical channel that triggers the UL SR is higher than the priority 2 of the sidelink logical channel included in the SL MAC PDU.

It should be noted that, when the value of the priority of the logical channel that triggers the UL SR is 0, there is no mapping priority that corresponds to the priority of the logical channel that triggers the UL SR and that can be compared with the priority of the sidelink logical channel included in the SL MAC PDU in Table 5. It is easy to understand that, because the logical channel that triggers the UL SR and whose priority value is 0 is a logical channel having a highest priority among all the logical channels on the UL, the priority of the logical channel that triggers the UL SR and whose priority value is 0 is higher than priorities of all the logical channels included in the SL MAC PDU.

Optionally, when the value of the mapping priority of the priority of the logical channel that triggers the UL SR is the same as the priority of the sidelink logical channel included in the SL MAC PDU, the priority of the logical channel that triggers the UL SR is the same as the priority of the sidelink logical channel included in the SL MAC PDU. In this case, whether the terminal device selects to preferentially send the SR or the SL MAC PDU depends on a specific implementation of the terminal device. This is not limited in this embodiment of this application. For example, based on channel conditions of the two links, namely, the UL and the SL, the terminal device may preferentially perform transmission on a link having a better channel condition. For another example, the terminal device is an in-vehicle terminal and is in a high-speed driving state. For example, if a vehicle speed exceeds 120 km/h, the terminal device preferentially sends the SL MAC PDU; otherwise, the terminal device preferentially sends the SR.

TABLE 6

| Priority of the sidelink logical channel included in the SL MAC PDU | Mapping priority of the priority of the sidelink logical channel included in the SL MAC PDU | Priority of the logical channel that triggers the UL SR |
|---|---|---|
| 0 | 1 | 0 |
| 1 | 2 | 1 |
| 2 | 3 | 2 |
| 3 | 4 | 3 |
| 4 | 5 | 4 |
| 5 | 6 | 5 |
| 6 | 7 | 6 |
| 7 | 8 | 7 |
| 8 | 9 | 8 |
| 9 | 10 | 9 |
| 10 | 11 | 10 |
| 11 | 12 | 11 |
| 12 | 13 | 12 |
| 13 | 14 | 13 |
| 14 | 15 | 14 |
| 15 |  | 15 |

For example, Table 6 is an example 1 of the second mapping relationship, and the second mapping relationship is used to convert the priority of the sidelink logical channel included in the SL MAC PDU into the mapping priority that can be compared with the priority of the logical channel that triggers the UL SR. As shown in Table 6, the priority of the logical channel that triggers the UL SR and the priority of the sidelink logical channel included in the SL MAC PDU cannot be directly compared, and priority levels are both 16. In other words, both the priorities of the logical channels on the two links are 16 levels, and a smaller value indicates a higher priority. To be specific, a logical channel that triggers the UL SR and whose priority value is 0 is a logical channel having a highest priority among all the logical channels on the UL, and a logical channel that triggers the UL SR and whose priority value is 15 is a logical channel having a lowest priority among all the logical channels on the UL. For example, assuming that values of the priority of the sidelink logical channel included in the SL MAC PDU and the priority of the logical channel that triggers the UL SR are respectively 3 and 5, based on Table 6, a value of the mapping priority that corresponds to the priority of the sidelink logical channel included in the SL MAC PDU and that can be compared with the priority of the logical channel that triggers the UL SR is 4, and is less than the value 5 of the priority of the logical channel that triggers the UL SR. In this case, it may be determined that the priority 3 of the sidelink logical channel included in the SL MAC PDU is higher than the priority 5 of the logical channel that triggers the UL SR.

It should be noted that, when the value of the priority of the sidelink logical channel included in the SL MAC PDU is 15, there is no mapping priority that corresponds to the priority of the sidelink logical channel included in the SL MAC PDU and that can be compared with the priority of the logical channel that triggers the UL SR in Table 6. It is easy to understand that, because the sidelink logical channel that is included in the SL MAC PDU and whose priority value is 15 is a sidelink logical channel having a lowest priority among all the sidelink logical channels on the SL, the priority of the sidelink logical channel that is included in the SL MAC PDU and whose priority value is 15 is lower than priorities of all the logical channels that trigger the UL SR.

TABLE 7

| Priority of the logical channel that triggers the UL SR | Mapping priority of the priority of the logical channel that triggers the UL SR | Priority of the sidelink logical channel included in the SL MAC PDU |
|---|---|---|
| 0 | 0 | 0 |
| 1 | | |
| 2 | 1 | 1 |
| 3 | | |
| 4 | 2 | 2 |
| 5 | | |
| 6 | 3 | 3 |
| 7 | | |
| 8 | 4 | 4 |
| 9 | | |
| 10 | 5 | 5 |
| 11 | | |
| 12 | 6 | 6 |
| 13 | | |
| 14 | 7 | 7 |
| 15 | | |

For example, Table 7 is an example 2 of the first mapping relationship, and the first mapping relationship is used to convert the priority of the logical channel that triggers the UL SR into the mapping priority that can be compared with the priority of the sidelink logical channel included in the SL MAC PDU. As shown in Table 7, priority levels of the logical channel that triggers the UL SR and the sidelink logical channel included in the SL MAC PDU are respectively 16 and 8. In other words, the priority levels of the logical channel that triggers the UL SR are twice the priority levels of the sidelink logical channel included in the SL MAC PDU, and cannot be directly compared. In addition, for logical channels on a same link, a smaller priority value indicates a higher priority. To be specific, for the UL, a logical channel that triggers the UL SR and whose priority value is 0 is a logical channel having a highest priority among all the logical channels on the UL, and a logical channel that triggers the UL SR and whose priority value is 15 is a logical channel having a lowest priority among all the logical channels on the UL; for the SL, a sidelink logical channel that is included in the SL MAC PDU and whose priority value is 0 is a sidelink logical channel having a highest priority among all the sidelink logical channels on the SL, and a sidelink logical channel that is included in the SL MAC PDU and whose priority value is 7 is a sidelink logical channel having a lowest priority among all the sidelink logical channels on the SL.

For example, assuming that values of the priority of the logical channel that triggers the UL SR and the priority of the sidelink logical channel included in the SL MAC PDU are both 2, based on Table 7, a value of the mapping priority that corresponds to the priority of the logical channel that triggers the UL SR and that can be compared with the priority of the sidelink logical channel included in the SL MAC PDU is 1, and is less than the value 2 of the priority of the sidelink logical channel included in the SL MAC PDU. In this case, it may be determined that the priority 2 of the logical channel that triggers the UL SR is higher than the priority 2 of the sidelink logical channel included in the SL MAC PDU.

TABLE 8

| Priority of the sidelink logical channel included in the SL MAC PDU | Mapping priority of the priority of the sidelink logical channel included in the SL MAC PDU | Priority of the logical channel that triggers the UL SR |
|---|---|---|
| 0 | 0 | 0 |
| | 1 | 1 |
| 1 | 2 | 2 |
| | 3 | 3 |
| 2 | 4 | 4 |
| | 5 | 5 |
| 3 | 6 | 6 |
| | 7 | 7 |
| 4 | 8 | 8 |
| | 9 | 9 |
| 5 | 10 | 10 |
| | 11 | 11 |
| 6 | 12 | 12 |
| | 13 | 13 |
| 7 | 14 | 14 |
| | 15 | 15 |

For example, Table 8 is an example 2 of the second mapping relationship, and the second mapping relationship is used to convert the priority of the sidelink logical channel included in the SL MAC PDU into the mapping priority that can be compared with the priority of the logical channel that triggers the UL SR. As shown in Table 8, priority levels of the logical channel that triggers the UL SR and the sidelink logical channel included in the SL MAC PDU are respectively 8 and 16. In other words, the priority levels of the logical channel that triggers the UL SR are twice the priority levels of the sidelink logical channel included in the SL MAC PDU, and cannot be directly compared. In addition, for logical channels on a same link, a smaller priority value indicates a higher priority. To be specific, for the SL, a logical channel that is included in the SL MAC PDU and whose priority value is 0 is a logical channel having a highest priority among all the logical channels on the SL, and a logical channel that is included in the SL MAC PDU and whose priority value is 7 is a logical channel having a lowest priority among all the logical channels on the SL; for the UL, a logical channel that triggers the UL SR and whose priority value is 0 is a logical channel having a highest priority among all the logical channels on the UL, and a logical channel that triggers the UL SR and whose priority value is 15 is a logical channel having a lowest priority among all the logical channels on the UL.

For example, assuming that values of the priority of the logical channel that triggers the UL SR and the priority of the sidelink logical channel included in the SL MAC PDU are both 2, and the mapping priority that corresponds to the priority of the logical channel that triggers the UL SR and that can be compared with the priority of the sidelink logical channel included in the SL MAC PDU is an even number, based on Table 8, a value of the mapping priority that corresponds to the priority of the sidelink logical channel included in the SL MAC PDU and that can be compared with the priority of the logical channel that triggers the UL SR is 4, and is greater than the value 2 of the priority of the logical channel that triggers the UL SR. In this case, it may be determined that the priority 2 of the sidelink logical channel included in the SL MAC PDU is lower than the priority 2 of the logical channel that triggers the UL SR.

It should be noted that, as shown in Table 8, a priority of a same logical channel included in the SL MAC PDU may correspond to two mapping priority values that can be compared with a priority of a logical channel that triggers the UL SR, and a specific mapping priority value to be converted into may be determined depending on a specific implementation of the terminal device. For example, it may be determined, based on a priority mapping indication from the network device, whether the priority of the sidelink logical channel included in the SL MAC PDU is converted into an even value or an odd value of the mapping priority. The terminal device may obtain the priority mapping indication by using RRC signaling, an SIB, a MAC CE, DCI, pre-configured signaling, or the like from the network device. Optionally, if the terminal device is an in-vehicle terminal and is in a driving state, when a vehicle speed exceeds a vehicle speed threshold, for example, the vehicle speed exceeds 90 km/h, the priority of the sidelink logical channel included in the SL MAC PDU is converted into an even value of the mapping priority; otherwise, the priority of the sidelink logical channel included in the SL MAC PDU is converted into an odd value.

In addition, refer to Table 5 to Table 8. When the mapping priority value of the priority of the sidelink logical channel included in the SL MAC PDU is the same as the priority of the logical channel that triggers the UL SR, or when the priority of the sidelink logical channel included in the SL MAC PDU is the same as the mapping priority value of the priority of the logical channel that triggers the UL SR, the priority of the sidelink logical channel included in the SL MAC PDU is the same as the priority of the logical channel that triggers the UL SR. In this case, whether the terminal device selects to preferentially send the SL MAC PDU or the SR depends on a specific implementation of the terminal device. This is not limited in this embodiment of this application. For example, based on channel conditions of the two links, namely, the UL and the SL, the terminal device may preferentially perform transmission on a link having a better channel condition. For another example, it is assumed that the terminal device is an in-vehicle terminal and a vehicle is in a high-speed driving state. For example, if a vehicle speed exceeds 120 km/h, the terminal device preferentially sends the SL MAC PDU; otherwise, the terminal device preferentially sends the SR.

In this embodiment of this application, when there are a plurality of logical channels that trigger the UL SR, and/or there are a plurality of sidelink logical channels included in the SL MAC PDU, only a highest priority of the plurality of logical channels that trigger the UL SR needs to be compared with a highest priority of the plurality of logical channels included in the SL MAC PDU. For example, the logical channels that trigger the UL SR include a logical channel A and a logical channel B, a priority of the logical channel A is higher than that of the logical channel B; the sidelink logical channels included in the SL MAC PDU include a logical channel 1, a logical channel 2, and a logical channel 3, and a priority of the logical channel 1 is higher than a priority of the logical channel 2 and a priority of the logical channel 3. In this case, only the priority of the logical channel A needs to be compared with the priority of the logical channel 1.

Based on the first mapping relationship, in a possible design method, that the terminal device preferentially sends the SR or the SL MAC PDU based on the second configuration information in S402 may include:

The terminal device converts, based on the first mapping relationship, a highest priority of the logical channel that triggers the UL SR into a first mapping priority. Then, if a highest priority of the sidelink logical channel included in the SL MAC PDU is higher than or equal to the first mapping priority, the terminal device preferentially sends the SL MAC PDU; otherwise, the terminal device preferentially sends the UL SR.

Alternatively, optionally, that the terminal device preferentially sends the SR or the SL MAC PDU based on the second configuration information in S402 may include:

The terminal device converts, based on the first mapping relationship, a highest priority of the logical channel that triggers the UL SR into a first mapping priority. Then, if a highest priority of the sidelink logical channel included in the SL MAC PDU is lower than or equal to the first mapping priority, the terminal device preferentially sends the UL SR; otherwise, the terminal device preferentially sends the SL MAC PDU.

Based on the second mapping relationship, in a possible design method, that the terminal device preferentially sends the SR or the SL MAC PDU based on the second configuration information in S402 may include the following.

The terminal device converts, based on the second mapping relationship, a highest priority of the sidelink logical channel included in the SL MAC PDU into a second mapping priority. Then, if the second mapping priority is higher than or equal to a highest priority of the logical channel that triggers the UL SR, the terminal device preferentially sends the SL MAC PDU; otherwise, the terminal device preferentially sends the UL SR.

Alternatively, optionally, that the terminal device preferentially sends the SR or the SL MAC PDU based on the second configuration information in S402 may include:

The terminal device converts, based on the second mapping relationship, a highest priority of the sidelink logical channel included in the SL MAC PDU into a second mapping priority. Then, if the second mapping priority is lower than or equal to a highest priority of the logical channel that triggers the UL SR, the terminal device preferentially sends the UL SR; otherwise, the terminal device preferentially sends the SL MAC PDU.

For example, that the terminal device preferentially sends the SL MAC PDU may include: The terminal device sends the SL MAC PDU, and skips sending the SR; the terminal device sends the SR and the SL MAC PDU, and reduces a transmit power of the SR; or the terminal device sends the SR and the SL MAC PDU, and increases a transmit power of the SL MAC PDU.

For example, that the terminal device preferentially sends the SR may include: The terminal device sends the SR, and skips sending the SL MAC PDU; the terminal device sends the SR and the SL MAC PDU, and reduces a transmit power of the SL MAC PDU; or the terminal device sends the SR and the SL MAC PDU, and increases a transmit power of the SR.

It should be noted that the logical channel that triggers the SL SR and the sidelink logical channel included in the SL MAC PDU are both logical channels on the SL, and the two logical channels usually use a same priority representation manner and have a same priority level. Therefore, the priority of the logical channel that triggers the SL SR may be directly compared with the priority of the sidelink logical channel included in the SL MAC PDU. Details are not described in this embodiment of this application.

In addition, when determining the foregoing preferential sending solution, the terminal device may further deliver a data transmission indication to a lower layer, for example, a physical layer (PHY). For example, the data transmission indication is used to indicate the physical layer to preferentially send the SR on a UL-SCH, or to preferentially send the SL MAC PDU on an SL-SCH.

The following uses an example to describe an execution procedure of S402.

Step 4: The terminal device compares, based on the first mapping relationship or the second mapping relationship, the priority of the sidelink logical channel included in the SL MAC PDU with the highest priority of the logical channel that triggers the UL SR. Then, the terminal device performs step 5 or step 6.

Step 5: If the priority of the sidelink logical channel included in the SL MAC PDU is higher than or equal to the highest priority of the logical channel that triggers the UL SR, the terminal device preferentially sends the SL MAC PDU; otherwise, the terminal device preferentially sends the SR.

Step 6: If the priority of the sidelink logical channel included in the SL MAC PDU is lower than or equal to the highest priority of the logical channel that triggers the UL SR, the terminal device preferentially sends the SR; otherwise, the terminal device preferentially sends the SL MAC PDU.

It should be noted that only step 5 or step 6 may be selected for execution.

For technical effects of the communication method shown in FIG. 4, refer to the technical effects of the communication system shown in FIG. 1. Details are not described herein again.

It should be noted that both the communication methods shown in FIG. 3 and FIG. 4 are examples of determining the sending priorities of the two links, namely, the UL and the SL. In addition, priorities of logical channels of different standards on a same link may use different priority representation manners. Therefore, priorities of logical channels of two different standards cannot be directly compared. Therefore, an embodiment of this application further provides a communication method. The communication method is used to preferentially send data of a standard when different standards conflict on a same link. For example, on an SL, when LTE data conflicts with NR data, the LTE data is preferentially sent, or the NR data is preferentially sent.

FIG. 5 is a third schematic flowchart of a communication method according to an embodiment of this application. The communication method is applicable to a scenario, of direct communication between the two terminal devices on an SL, shown in FIG. 1. The following uses an example in which a first terminal device serves as a sender and sends data on the SL for detailed description. As shown in FIG. 5, the communication method includes the following steps.

S501: The first terminal device obtains third configuration information.

For example, the third configuration information includes a third mapping relationship and/or a fourth mapping relationship. The third mapping relationship is used to convert a priority of a sidelink logical channel of NR into a mapping priority that can be compared with a priority of a sidelink logical channel of LTE. The fourth mapping relationship is used to convert the priority of the sidelink logical channel of LTE into a mapping priority that can be compared with the priority of the sidelink logical channel of NR.

In a possible design method, that the first terminal device obtains third configuration information in S501 may include: The first terminal device receives the third configuration information from a network device; or the first terminal device obtains the third configuration information from a local buffer.

For example, that first terminal device receives the third configuration information from a network device may include: The first terminal device may receive and parse downlink signaling that is from the network device and that carries the third configuration information, to obtain the third configuration information. For example, the downlink signaling may be RRC signaling, broadcast, an SIB, or a PDCCH. This is not limited in this embodiment of this application.

Optionally, the first terminal device may alternatively receive the third configuration information pre-configured by the network device. For example, the first terminal device may receive, in a registration process, the third configuration information pre-configured by the network device.

For example, that the first terminal device obtains the third configuration information from a local buffer may include: The first terminal device may read, from the local buffer of the first terminal device, the third configuration information obtained and stored before. For example, the locally buffered third configuration information may be the third configuration information received by using the foregoing downlink signaling or in the pre-configuration manner, or is predefined in a protocol and written into the local buffer of the first terminal device in advance in a manufacturing process of the first terminal device or when a user performs a network access procedure. A manner of initially obtaining the third configuration information stored in the local buffer of the first terminal device is not limited in this embodiment of this application.

S502: The first terminal device preferentially sends NR data or LTE data based on the third configuration information.

Optionally, if the priority of the sidelink logical channel of LTE and the priority of the sidelink logical channel of NR use a same priority representation manner and include a same priority level, the priorities of the logical channels of the two standards may be directly compared.

The following describes in detail, by using specific examples of the third mapping relationship and the fourth mapping relationship, various optional solutions in which the first terminal device compares the priority of the sidelink logical channel of LTE and the priority of the sidelink logical channel of NR.

For example, Table 9 is an example 1 of the third mapping relationship, and the third mapping relationship is used to convert the priority of the sidelink logical channel of NR into the mapping priority that can be compared with the priority (for example, a PPPP value) of the sidelink logical channel of LTE. As shown in Table 9, the priority of the sidelink logical channel of NR cannot be directly compared with the priority of the sidelink logical channel of LTE, and priority levels are both 8, that is, priorities of the two standards are eight levels, and a smaller value indicates a higher priority. For example, assuming that values of the priority of the sidelink logical channel of NR and the priority of the sidelink logical channel of LTE are respectively 2 and 3, based on Table 9, a value of the mapping priority that corresponds to the priority of the sidelink logical channel of NR and that can be compared with the priority of the sidelink logical channel of LTE is 2, and is less than the value 3 of the priority of the sidelink logical channel of LTE. In this case, it may be determined that the priority of the sidelink logical channel of NR is higher than the priority of the sidelink logical channel of LTE.

It should be noted that, when the value of the priority of the sidelink logical channel of NR is 0, there is no mapping priority that corresponds to the priority of the sidelink logical channel of NR and that can be compared with the priority of the sidelink logical channel of LTE in Table 9. It is easy to understand that, because the sidelink logical channel that is of NR and whose priority value is 0 is a logical channel having a highest priority among all logical channels on the SL, the priority of the sidelink logical channel that is of NR and whose priority value is 0 is higher than priorities of all sidelink logical channels of LTE.

Optionally, when the value of the mapping priority of the priority of the sidelink logical channel of NR is the same as the priority of the sidelink logical channel of LTE, the priority of the sidelink logical channel of NR is the same as the priority of the sidelink logical channel of LTE. In this case, whether the terminal device selects to preferentially perform NR SL transmission or LTE SL transmission depends on a specific implementation of the terminal device. This is not limited in this embodiment of this application.

TABLE 9

| Priority of the sidelink logical channel of NR | Mapping priority of the priority of the sidelink logical channel of NR | Priority (PPPP) of the sidelink logical channel of LTE |
| --- | --- | --- |
| 0 | | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |

For example, Table 10 is an example 1 of the fourth mapping relationship, and the fourth mapping relationship is used to convert the priority of the sidelink logical channel of LTE into the mapping priority that can be compared with the priority of the sidelink logical channel of NR. As shown in Table 10, the priority of the sidelink logical channel of NR cannot be directly compared with the priority of the sidelink logical channel of LTE, priority levels are both 8, and a smaller value indicates a higher priority. For example, assuming that values of the priority of the sidelink logical channel of LTE and the priority of the sidelink logical channel of NR are respectively 3 and 5, based on Table 10, a value of the mapping priority that corresponds to the priority of the sidelink logical channel of LTE and that can be compared with the priority of the sidelink logical channel of NR is 3, and is less than the value 5 of the priority of the sidelink logical channel of NR. In this case, it may be determined that the priority 3 of the sidelink logical channel of LTE is higher than the priority 5 of the sidelink logical channel of NR.

It should be noted that, when the value of the priority of the sidelink logical channel of LTE is 8, there is no mapping priority that corresponds to the priority of the sidelink logical channel of LTE and that can be compared with the priority of the sidelink logical channel of NR in Table 10. It is easy to understand that, because the sidelink logical channel that is of LTE and whose priority value is 8 is a sidelink logical channel having a lowest priority among all sidelink logical channels of LTE, a priority of the sidelink logical channel that is of LTE and whose priority value is 8 is lower than priorities of all sidelink logical channels of NR.

TABLE 10

| Priority (PPPP) of the sidelink logical channel of LTE | Mapping priority of the priority of the sidelink logical channel of LTE | Priority of the sidelink logical channel of NR |
| --- | --- | --- |
| 1 | 1 | 0 |
| 2 | 2 | 1 |

TABLE 10-continued

| Priority (PPPP) of the sidelink logical channel of LTE | Mapping priority of the priority of the sidelink logical channel of LTE | Priority of the sidelink logical channel of NR |
| --- | --- | --- |
| 3 | 3 | 2 |
| 4 | 4 | 3 |
| 5 | 5 | 4 |
| 6 | 6 | 5 |
| 7 | 7 | 6 |
| 8 | | 7 |

TABLE 11

| Priority of the sidelink logical channel of NR | Mapping priority of the priority of the sidelink logical channel of NR | Priority (PPPP) of the sidelink logical channel of LTE |
| --- | --- | --- |
| 0 | 1 | 1 |
| 1 | | |
| 2 | 2 | 2 |
| 3 | | |
| 4 | 3 | 3 |
| 5 | | |
| 6 | 4 | 4 |
| 7 | | |
| 8 | 5 | 5 |
| 9 | | |
| 10 | 6 | 6 |
| 11 | | |
| 12 | 7 | 7 |
| 13 | | |
| 14 | 8 | 8 |
| 15 | | |

For example, Table 11 is an example 2 of the third mapping relationship, and the third mapping relationship is used to convert the priority of the sidelink logical channel of NR into the mapping priority that can be compared with the priority of the sidelink logical channel of LTE. As shown in Table 11, priority levels of the sidelink logical channel of NR and the sidelink logical channel of LTE are respectively 16 and 8. In other words, the priority levels of the sidelink logical channel of NR are twice the priority levels of the sidelink logical channel of LTE, and cannot be directly compared, and a smaller priority value indicates a higher priority. For example, assuming that values of the priority of the sidelink logical channel of NR and the priority of the sidelink logical channel of LTE are both 4, based on Table 11, a value of the mapping priority that corresponds to the priority of the sidelink logical channel of NR and that can be compared with the priority of the sidelink logical channel of LTE is 3, and is less than the value 4 of the priority of the sidelink logical channel of LTE. In this case, it may be determined that the priority 4 of the sidelink logical channel of NR is higher than the priority 4 of the sidelink logical channel of LTE.

TABLE 12

| Priority (PPPP) of the sidelink logical channel of LTE | Mapping priority of the priority of the sidelink logical channel of LTE | Priority of the sidelink logical channel of NR |
| --- | --- | --- |
| 1 | 0 | 0 |
| | 1 | 1 |
| 2 | 2 | 2 |
| | 3 | 3 |
| 3 | 4 | 4 |
| | 5 | 5 |

TABLE 12-continued

| Priority (PPPP) of the sidelink logical channel of LTE | Mapping priority of the priority of the sidelink logical channel of LTE | Priority of the sidelink logical channel of NR |
|---|---|---|
| 4 | 6 | 6 |
|   | 7 | 7 |
| 5 | 8 | 8 |
|   | 9 | 9 |
| 6 | 10 | 10 |
|   | 11 | 11 |
| 7 | 12 | 12 |
|   | 13 | 13 |
| 8 | 14 | 14 |
|   | 15 | 15 |

For example, Table 12 is an example 2 of the fourth mapping relationship, and the fourth mapping relationship is used to convert the priority of the sidelink logical channel of LTE into the mapping priority that can be compared with the priority of the sidelink logical channel of NR. As shown in Table 12, priority levels of the sidelink logical channel of LTE and the sidelink logical channel of NR are respectively 8 and 16. In other words, the priority levels of the sidelink logical channel of NR are twice the priority levels of the sidelink logical channel of LTE, and cannot be directly compared, and a smaller priority value indicates a higher priority for a same standard.

For example, assuming that values of the priority of the sidelink logical channel of LTE and the priority of the sidelink logical channel of NR are respectively 5 and 2, and the mapping priority that corresponds to the priority of the sidelink logical channel of LTE and that can be compared with the priority of the sidelink logical channel of NR is an even number, based on Table 12, a value of the mapping priority that corresponds to the priority of the sidelink logical channel of LTE and that can be compared with the priority of the sidelink logical channel of NR is 8, and is greater than the value 2 of the priority of the sidelink logical channel of NR. In this case, it may be determined that the priority 5 of the sidelink logical channel of LTE is lower than the priority 2 of the sidelink logical channel of NR.

It should be noted that, as shown in Table 12, a priority of a same sidelink logical channel of LTE may correspond to two mapping priority values that can be compared with a priority of a sidelink logical channel of NR, and a specific mapping priority value to be converted into may be determined depending on a specific implementation of the terminal device. For example, it may be determined, based on a priority mapping indication from the network device, whether the priority of the sidelink logical channel of LTE is converted into an even value or an odd value of the mapping priority. The terminal device may obtain the priority mapping indication by receiving and parsing RRC signaling, an SIB, a MAC CE, DCI, pre-configured signaling, or the like from the network device.

Optionally, preferentially sending the NR data and preferentially sending the LTE data that are described above may be sending data to a same terminal device, for example, preferentially sending the NR data to the second terminal device, or preferentially sending the LTE data to the second terminal device. Alternatively, preferentially sending the NR data and preferentially sending the LTE data that are described above may be sending data to different terminal devices, for example, preferentially sending the NR data to the second terminal device, or preferentially sending the LTE data to a third terminal device.

For example, when direct communication of two standards exists between the first terminal device and a same terminal device, and the two standards conflict, the preferentially sending NR data may be specifically implemented as: sending the NR data, and skipping sending the LTE data. Similarly, the preferentially sending LTE data may be specifically implemented as: sending the LTE data, and skipping sending the NR data.

For example, when direct communication of two standards exists between the first terminal device and different terminal devices respectively, and the two standards conflict, the preferentially sending NR data may be specifically implemented as one of the following: sending the NR data, and skipping sending the LTE data; sending the NR data and the LTE data, and reducing a transmit power of the LTE data; or sending the NR data and the LTE data, and increasing a transmit power of the NR data. Similarly, the preferentially sending LTE data may be specifically implemented as one of the following: sending the LTE data, and skipping sending the NR data; sending the NR data and the LTE data, and reducing a transmit power of the NR data; or sending the NR data and the LTE data, and increasing a transmit power of the LTE data.

The communication methods provided in the embodiments of this application are described above in detail with reference to FIG. 3 to FIG. 5. The following describes in detail a communication apparatus according to the embodiments of this application with reference to FIG. 6.

Figure 6:
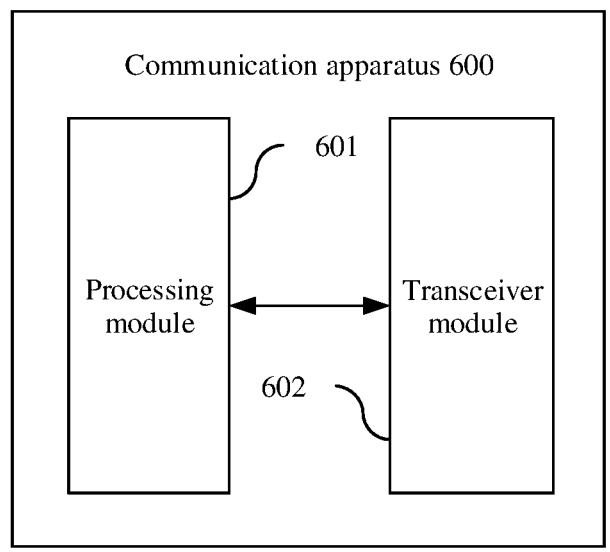
FIG. 6 is a second schematic diagram of a structure of a communication apparatus according to an embodiment of this application.

FIG. 6 is a second schematic diagram of a structure of a communication apparatus according to an embodiment of this application. The communication apparatus is usable in the communication system shown in FIG. 1, and performs a function of the terminal device in the communication method shown in FIG. 3. For ease of description, FIG. 6 shows only main components of the communication apparatus.

As shown in FIG. 6, the communication apparatus 600 includes a processing module 601 and a transceiver module 602.

For example, the processing module 601 is configured to obtain first configuration information. For example, the first configuration information includes indication information of an uplink medium access control control element UL MAC CE.

The processing module 601 is further configured to: preferentially send, in coordination with the transceiver module 602, an uplink medium access control packet data unit UL MAC PDU or a sidelink medium access control packet data unit SL MAC PDU based on the indication information. For example, the UL MAC PDU can be used to transmit the UL MAC CE.

For example, the UL MAC CE may include one or more of the following: a cell radio network temporary identifier MAC CE, a configured grant confirmation MAC CE, a MAC CE for a link buffer status report BSR with exception of a BSR included for padding, a MAC CE for a sidelink buffer status report SL BSR with exception of an SL BSR included for padding, and a power headroom report MAC CE.

Optionally, the UL MAC CE may further include one or more of the following: an uplink buffer status report UL BSR MAC CE corresponding to a specified logical channel, a sidelink buffer status report SL BSR MAC CE corresponding to a specified sidelink logical channel, a UL BSR MAC CE corresponding to a specified service, and an SL BSR MAC CE corresponding to a specified service. The specified logical channel or the specified sidelink logical channel may be determined by using a logical channel priority or a sidelink logical channel priority. For example, logical channel priorities 0, 1, and 2 are specified. When a highest priority of a corresponding logical channel that triggers the UL BSR MAC CE falls within a list of 0, 1, and 2, the UL BSR MAC CE belongs to the specified UL MAC CE.

Further, optionally, the different UL MAC CEs may be alternatively configured based on a highest priority of one or more sidelink logical channels included in an SL MAC PDU. For example, a UL MAC CE specified for a highest priority 0 of the sidelink logical channel included in the SL MAC PDU and a UL MAC CE specified for a highest priority 3 of the sidelink logical channel included in the SL MAC PDU may be different or not identical.

In a possible design, the processing module 601 is further configured to receive the first configuration information from a network device in coordination with the transceiver module 602; or the processing module 601 is further configured to obtain the first configuration information from a local buffer of the communication apparatus 600.

In a possible design, the processing module 601 is further configured to: if the UL MAC PDU and the SL MAC PDU satisfy a first condition, preferentially send the SL MAC PDU in coordination with the transceiver module 602. For example, the first condition is that the UL MAC PDU does not include random access data, the UL MAC PDU does not include emergency call data, the UL MAC PDU does not include the specified UL MAC CE, and a priority of the UL MAC PDU is lower than or equal to a priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

In another possible design, the processing module 601 is further configured to: if the UL MAC PDU and the SL MAC PDU satisfy a second condition, preferentially send the SL MAC PDU in coordination with the transceiver module 602. For example, the second condition is that the UL MAC PDU does not include random access data, the UL MAC PDU does not include emergency call data, and a priority of the UL MAC PDU is lower than or equal to a priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

Optionally, the processing module 601 is further configured to send, in coordination with the transceiver module 602, the SL MAC PDU and skip sending the UL MAC PDU; the processing module 601 is further configured to send, in coordination with the transceiver module 602, the UL MAC PDU and the SL MAC PDU, and reduce a transmit power of the UL MAC PDU; or the processing module 601 is further configured to send, in coordination with the transceiver module 602, the UL MAC PDU and the SL MAC PDU, and increase a transmit power of the SL MAC PDU.

Further, the processing module 601 is further configured to: if the UL MAC PDU and the SL MAC PDU overlap in time domain, send, in coordination with the transceiver module 602, the SL MAC PDU and skip sending the UL MAC PDU.

For example, the processing module 601 is further configured to: if the UL MAC PDU and the SL MAC PDU overlap in time domain and use a same transmit frequency, send, in coordination with the transceiver module 602, the SL MAC PDU and skip sending the UL MAC PDU; or the processing module 601 is further configured to: if the UL MAC PDU and the SL MAC PDU overlap in time domain and use different transmit frequencies, send, in coordination with the transceiver module 602, the SL MAC PDU and skip sending the UL MAC PDU.

Further, the processing module 601 is further configured to: if the UL MAC PDU and the SL MAC PDU overlap in time domain and use different transmit frequencies, send, in coordination with the transceiver module 602, the UL MAC PDU and the SL MAC PDU, and reduce the transmit power of the UL MAC PDU.

Further, the processing module 601 is further configured to: if the UL MAC PDU and the SL MAC PDU overlap in time domain and use different transmit frequencies, send, in coordination with the transceiver module 602, the UL MAC PDU and the SL MAC PDU, and increase the transmit power of the SL MAC PDU.

In a possible design, the processing module 601 is further configured to: if the UL MAC PDU includes the UL MAC CE, preferentially send the UL MAC PDU in coordination with the transceiver module 602.

Specifically, the processing module 601 is further configured to send, in coordination with the transceiver module 602, the UL MAC PDU and skip sending the SL MAC PDU; the processing module 601 is further configured to send, in coordination with the transceiver module 602, the UL MAC PDU and the SL MAC PDU, and reduce a transmit power of the SL MAC PDU; or the processing module 601 is further configured to send, in coordination with the transceiver module 602, the UL MAC PDU and the SL MAC PDU, and increase a transmit power of the UL MAC PDU.

Further, the processing module 601 is further configured to: if the UL MAC PDU and the SL MAC PDU overlap in time domain, send, in coordination with the transceiver module 602, the UL MAC PDU and skip sending the SL MAC PDU.

For example, the processing module 601 is further configured to: if the UL MAC PDU and the SL MAC PDU overlap in time domain and use a same transmit frequency, send, in coordination with the transceiver module 602, the UL MAC PDU and skip sending the SL MAC PDU; or the processing module 601 is further configured to: if the UL MAC PDU and the SL MAC PDU overlap in time domain and use different transmit frequencies, send, in coordination with the transceiver module 602, the UL MAC PDU and skip sending the SL MAC PDU.

Further, the processing module 601 is further configured to: if the UL MAC PDU and the SL MAC PDU overlap in time domain and use different transmit frequencies, send, in coordination with the transceiver module 602, the UL MAC PDU and the SL MAC PDU, and reduce the transmit power of the SL MAC PDU.

Further, the processing module 601 is further configured to: if the UL MAC PDU and the SL MAC PDU overlap in time domain and use different transmit frequencies, send, in coordination with the transceiver module 602, the UL MAC PDU and the SL MAC PDU, and increase the transmit power of the UL MAC PDU.

Optionally, the communication apparatus 600 may further include a storage module (not shown in FIG. 6), and the storage module stores a program or instructions. When the processing module 601 executes the program or the instructions, the communication apparatus 600 is enabled to perform a function of the terminal device in the communication method shown in FIG. 3.

In the embodiments of this application, the communication apparatus 600 is also usable in the communication system shown in FIG. 1, and performs a function of the terminal device in the communication method shown in FIG. 4.

The transceiver module 602 is configured to receive second configuration information from a network device. The second configuration information includes a first mapping relationship and/or a second mapping relationship used by the terminal device to compare a priority of a logical channel that triggers a scheduling request SR with a priority of a sidelink logical channel included in a sidelink medium access control packet data unit SL MAC PDU The processing module 601 is configured to: preferentially send the SR or the SL MAC PDU based on the second configuration information in coordination with the transceiver module 602.

In a possible design, the SR may include an uplink scheduling request UL SR; and the first mapping relationship is used to convert the priority of the logical channel that triggers the scheduling request SR into a mapping priority that can be compared with the priority of the sidelink logical channel included in the sidelink medium access control packet data unit SL MAC PDU. Correspondingly, the processing module 601 is further configured to convert, based on the first mapping relationship, a highest priority of a logical channel that triggers the UL SR into a first mapping priority; and the processing module 601 is further configured to: if a highest priority of the sidelink logical channel included in the SL MAC PDU is higher than or equal to the first mapping priority, preferentially send the SL MAC PDU in coordination with the transceiver module 602.

In another possible design, the SR may include an uplink scheduling request UL SR; and the second mapping relationship is used to convert the priority of the sidelink logical channel included in the SL MAC PDU into a mapping priority that can be compared with the priority of the logical channel that triggers the SR. Correspondingly, the processing module 601 is further configured to convert, based on the second mapping relationship, a highest priority of the sidelink logical channel included in the SL MAC PDU into a second mapping priority; and the processing module 601 is further configured to: if the second mapping priority is higher than or equal to a highest priority of a logical channel that triggers the UL SR, preferentially send the SL MAC PDU in coordination with the transceiver module 602.

Optionally, the processing module 601 is further configured to send, in coordination with the transceiver module 602, the SL MAC PDU and skip sending the SR; the processing module 601 is further configured to send, in coordination with the transceiver module 602, the SR and the SL MAC PDU, and reduce a transmit power of the SR; or the processing module 601 is further configured to send, in coordination with the transceiver module 602, the SR and the SL MAC PDU, and increase a transmit power of the SL MAC PDU.

In a possible design, the SR may include an uplink scheduling request UL SR; and the first mapping relationship is used to convert the priority of the logical channel that triggers the scheduling request SR into a mapping priority that can be compared with the priority of the sidelink logical channel included in the sidelink medium access control packet data unit SL MAC PDU. Correspondingly, the processing module 601 is further configured to convert, based on the first mapping relationship, a highest priority of a logical channel that triggers the UL SR into a first mapping priority; and the processing module 601 is further configured to: if a highest priority of the sidelink logical channel included in the SL MAC PDU is lower than or equal to the first mapping priority, preferentially send the UL SR in coordination with the transceiver module 602.

In another possible design, the SR may include an uplink scheduling request UL SR; and the second mapping relationship is used to convert the priority of the sidelink logical channel included in the SL MAC PDU into a mapping priority that can be compared with the priority of the logical channel that triggers the SR. Correspondingly, the processing module 601 is further configured to convert, based on the second mapping relationship, a highest priority of the sidelink logical channel included in the SL MAC PDU into a second mapping priority; and the processing module 601 is further configured to: if the second mapping priority is lower than or equal to a highest priority of a logical channel that triggers the UL SR, preferentially send the UL SR in coordination with the transceiver module 602.

Optionally, the processing module 601 is further configured to send, in coordination with the transceiver module 602, the SR and skip sending the SL MAC PDU; the processing module 601 is further configured to send, in coordination with the transceiver module 602, the SR and the SL MAC PDU, and reduce a transmit power of the SL MAC PDU; or the processing module 601 is further configured to send, in coordination with the transceiver module 602, the SR and the SL MAC PDU, and increase a transmit power of the SR.

Optionally, the communication apparatus 600 may further include a storage module (not shown in FIG. 6), and the storage module stores a program or instructions. When the processing module 601 executes the program or the instructions, the communication apparatus 600 is enabled to perform a function of the terminal device in the communication method shown in FIG. 4.

It should be noted that the communication apparatus 600 may be a terminal device, or may be a chip or a chip system disposed in the terminal device. This is not limited in this application.

For technical effects of the communication apparatus 600, refer to the technical effects of the communication method shown in FIG. 4. Details are not described herein again.

In the embodiments of this application, the communication apparatus 600 is also usable in the communication system shown in FIG. 1, and performs a function of the network device in the communication method shown in FIG. 4.

The processing module 601 is configured to send first configuration information and/or second configuration information to a terminal device in coordination with the transceiver module 602. The first configuration information includes indication information of an uplink medium access control control element UL MAC CE, the indication information is used to indicate the terminal device to preferentially send an uplink medium access control packet data unit UL MAC PDU or a sidelink medium access control packet data unit SL MAC PDU, and the UL MAC PDU can be used to transmit the UL MAC CE. The second configuration information includes a first mapping relationship and/or a second mapping relationship that are used by the terminal device to compare a priority of a logical channel that triggers a scheduling request SR with a priority of a sidelink logical channel included in the sidelink medium access control packet data unit SL MAC PDU, and the terminal device preferentially sends the SR or the SL MAC PDU based on the second configuration information.

In a possible design, that the terminal device preferentially sends the uplink medium access control packet data unit UL MAC PDU or the sidelink medium access control packet data unit SL MAC PDU may include: If the UL MAC PDU includes the specified UL MAC CE, the terminal device preferentially sends the UL MAC PDU.

In another possible design, that the terminal device preferentially sends the uplink medium access control packet data unit UL MAC PDU or the sidelink medium access control packet data unit SL MAC PDU may include: If the UL MAC PDU and the SL MAC PDU satisfy a first condition, the terminal device preferentially sends the SL MAC PDU. For example, the first condition is that the UL MAC PDU does not include random access data, the UL MAC PDU does not include emergency call data, the UL MAC PDU does not include the specified UL MAC CE, and a priority of the UL MAC PDU is lower than or equal to a priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

In another possible design, that the terminal device preferentially sends the uplink medium access control packet data unit UL MAC PDU or the sidelink medium access control packet data unit SL MAC PDU may include: If the UL MAC PDU and the SL MAC PDU satisfy a second condition, the terminal device preferentially sends the SL MAC PDU. For example, the second condition is that the UL MAC PDU does not include random access data, the UL MAC PDU does not include emergency call data, and a priority of the UL MAC PDU is lower than or equal to a priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

In a possible design, the SR may include an uplink scheduling request UL SR, the second configuration information includes a first mapping relationship, and the first mapping relationship is used to convert a priority of a logical channel that triggers the UL SR into a mapping priority that can be compared with the priority of the sidelink logical channel included in the SL MAC PDU. Correspondingly, that the terminal device compares the priority of the logical channel that triggers the scheduling request SR with the priority of the sidelink logical channel included in the sidelink medium access control packet data unit SL MAC PDU, and preferentially sends the SR or the SL MAC PDU based on the second configuration information may include: The terminal device converts, based on the first mapping relationship, a highest priority of the logical channel that triggers the UL SR into a first mapping priority; and the terminal device preferentially sends the SR or the SL MAC PDU based on a result of comparing the first mapping priority with a highest priority of the sidelink logical channel included in the SL MAC PDU.

In another possible design, the SR may include an uplink scheduling request UL SR, the second configuration information further includes a second mapping relationship, and the second mapping relationship is used to convert the priority of the sidelink logical channel included in the SL MAC PDU into a mapping priority that can be compared with a priority of a logical channel that triggers the UL SR. Correspondingly, that the terminal device compares the priority of the logical channel that triggers the scheduling request SR with the priority of the sidelink logical channel included in the sidelink medium access control packet data unit SL MAC PDU, and preferentially sends the SR or the SL MAC PDU based on the second configuration information may include: The terminal device converts, based on the second mapping relationship, a highest priority of the sidelink logical channel included in the SL MAC PDU into a second mapping priority; and preferentially sends the SR or the SL MAC PDU based on a result of comparing a highest priority of the logical channel that triggers the UL SR with the second mapping priority.

Optionally, the communication apparatus 600 may further include a storage module (not shown in FIG. 6), and the storage module stores a program or instructions. When the processing module 601 executes the program or the instructions, the communication apparatus 600 is enabled to perform a function of the network device in the communication method shown in FIG. 4.

It should be noted that the communication apparatus 600 may be a network device, or may be a chip or a chip system disposed in the network device. This is not limited in this application.

For technical effects of the communication apparatus 600, refer to the technical effects of the communication method shown in FIG. 4. Details are not described herein again.

In the embodiments of this application, the communication apparatus 600 is also usable in the communication system shown in FIG. 1, and performs a function of the first terminal device in the communication method shown in FIG. 5.

For example, the processing module 601 is configured to obtain third configuration information.

For example, the third configuration information includes a third mapping relationship and/or a fourth mapping relationship. The third mapping relationship is used to convert a priority of a sidelink logical channel of NR into a mapping priority that can be compared with a priority of a sidelink logical channel of LTE. The fourth mapping relationship is used to convert the priority of the sidelink logical channel of LTE into a mapping priority that can be compared with the priority of the sidelink logical channel of NR.

The processing module 601 is further configured to preferentially send, in coordination with the transceiver module 602, NR data or LTE data based on the third configuration information.

In a possible design method, the transceiver module 602 is further configured to receive the third configuration information from a network device. Alternatively, optionally, the processing module 601 is further configured to obtain the third configuration information from a local buffer.

For example, the preferentially sending NR data may be specifically implemented as one of the following: sending the NR data, and skipping sending the LTE data; sending the NR data and the LTE data, and reducing a transmit power of the LTE data; or sending the NR data and the LTE data, and increasing a transmit power of the NR data. Similarly, the preferentially sending LTE data may be specifically implemented as one of the following: sending the LTE data, and skipping sending the NR data; sending the NR data and the LTE data, and reducing a transmit power of the NR data; or sending the NR data and the LTE data, and increasing a transmit power of the LTE data.

Optionally, the communication apparatus 600 may further include a storage module (not shown in FIG. 6), and the storage module stores a program or instructions. When the processing module 601 executes the program or the instructions, the communication apparatus 600 is enabled to perform a function of the terminal device in the communication method shown in FIG. 6.

It should be noted that the communication apparatus 600 may be a terminal device, or may be a chip or a chip system disposed in the terminal device. This is not limited in this application.

For technical effects of the communication apparatus 600, refer to the technical effects of the communication method shown in FIG. 5. Details are not described herein again.

An embodiment of this application provides a communication apparatus. The communication apparatus is configured to implement the foregoing communication methods. The communication apparatus may be the terminal device in the communication method in the foregoing method embodiments, for example, an in-vehicle communication apparatus, or an apparatus including the terminal device, for example, various types of vehicles, or an apparatus or a component included in the terminal device, for example, a system chip. Alternatively, the communication apparatus may be the network device in the communication method in the foregoing method embodiments, or an apparatus or a component included in the network device, for example, a system chip. The communication apparatus includes a corresponding module, unit, or means for implementing the foregoing communication method. The module, unit, or means may be implemented by hardware, software, or hardware executing corresponding software. The hardware or the software includes one or more modules or units corresponding to the foregoing functions.

An embodiment of this application provides a chip system. The chip system includes a processor and an input/output port. The processor is configured to implement a processing function in the communication method in the foregoing method embodiment, and the input/output port is configured to implement a transceiver function in the communication method in the foregoing method embodiment.

In a possible design, the chip system further includes a memory. The memory is configured to store program instructions and data for implementing a function of the communication methods according to the first aspect to the third aspect.

The chip system may include a chip, or may include the chip and another discrete component.

An embodiment of this application provides a communication system. The system includes one or more terminal devices described above and one or more network devices.

An embodiment of this application provides a computer-readable storage medium. The computer-readable storage medium stores computer instructions. When the computer instructions are run on a computer, the computer is enabled to perform the communication method according to the foregoing method embodiment.

An embodiment of this application provides a computer program product including instructions. The computer program product includes a computer program or the instructions. When the computer program is run or the instructions are run on a computer, the computer is enabled to perform the communication method in the foregoing method embodiment.

It should be understood that the processor in the embodiments of this application may be a central processing unit (CPU). Alternatively, the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, any conventional processor, or the like.

It should be further understood that the memory in the embodiments of this application may be a volatile memory or a nonvolatile memory, or may include both a volatile memory and a nonvolatile memory. For example, the nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external buffer. Through example but not limitative description, random access memories (RAMs) in many forms are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

All or some of the foregoing embodiments may be implemented by using software, hardware (for example, a circuit), firmware, or any combination thereof. When software is used to implement the embodiments, all or some of the embodiments may be implemented in a form of a computer program product. The computer program product includes one or more computer instructions or computer programs. When the program instructions or the computer programs are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: only A exists, both A and B exist, and only B exists. A and B may be singular or plural. In addition, the character "/" in this specification usually represents an "or" relationship between the associated objects, or may represent an "and/or" relationship. A specific meaning depends on foregoing and following descriptions.

In this application, "at least one" means one or more, and "a plurality of" means two or more. "At least one of the following items (pieces)" or a similar expression thereof indicates any combination of these items, including a single item (piece) or any combination of a plurality of items (pieces). For example, at least one item (piece) of a, b, or c may represent: a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, the functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to a terminal device, comprising:
    obtaining first configuration information, wherein the first configuration information comprises indication information of an uplink medium access control control element (UL MAC CE); and
    preferentially sending when an uplink medium access control packet data unit (UL MAC PDU) comprises the UL MAC CE, the UL MAC PDU based on the indication information, wherein the UL MAC PDU transmits the UL MAC CE, and
    wherein preferentially sending the UL MAC PDU comprises:
        sending the UL MAC PDU, and skipping sending a sidelink medium access control packet data unit (SL MAC PDU);
        sending the UL MAC PDU and the SL MAC PDU, and reducing a transmit power of the SL MAC PDU; or
        sending the UL MAC PDU and the SL MAC PDU, and increasing a transmit power of the UL MAC PDU.

2. The method according to claim 1, wherein the UL MAC CE comprises one or more of the following: a cell radio network temporary identifier MAC CE, a configured grant confirmation MAC CE, a MAC CE for a link buffer status report (BSR) except a a BSR used for padding, a MAC CE for a sidelink buffer status report (SL BSR) except of an SL BSR used for padding, or a power headroom report MAC CE.

3. The method according to claim 1, wherein obtaining the first configuration information comprises:
    obtaining the first configuration information from a local buffer.

4. An apparatus, comprising:
    at least one processor; and
    a non-transitory memory storing instructions that are executable by the at least one processor;
    wherein the instructions comprise instructions for:
        obtaining first configuration information, wherein the first configuration information comprises indication information of an uplink medium access control control element (UL MAC CE); and
        preferentially sending, when an uplink medium access control packet data unit (UL MAC PDU) comprises the UL MAC CE, the UL MAC PDU based on the indication information, wherein the UL MAC PDU transmits the UL MAC CE, and
        wherein preferentially sending the UL MAC PDU comprises:
            sending the UL MAC PDU, and skipping sending a sidelink medium access control packet data unit (SL MAC PDU);
            sending the UL MAC PDU and the SL MAC PDU, and reducing a transmit power of the SL MAC PDU; or
            sending the UL MAC PDU and the SL MAC PDU, and increasing a transmit power of the UL MAC PDU.

5. The apparatus according to claim 4, wherein the UL MAC CE comprises one or more of the following: a cell radio network temporary identifier MAC CE, a configured grant confirmation MAC CE, a MAC CE for a link buffer status report (BSR) except a BSR used for padding, a MAC CE for a sidelink buffer status report (SL BSR) except a SL BSR used for padding, or a power headroom report MAC CE.

6. The apparatus according to claim 4, wherein obtaining the first configuration information comprises:
obtaining the first configuration information from a local buffer.

7. A non-transitory computer-readable storage medium, comprising instructions that are executable by at least one processor, wherein the instructions include instructions for causing a communications apparatus to perform:
obtaining first configuration information, wherein the first configuration information comprises indication information of an uplink medium access control control element (UL MAC CE); and
preferentially sending, when an uplink medium access control packet data unit (UL MAC PDU) comprises the UL MAC CE, the UL MAC PDU based on the indication information, wherein the UL MAC PDU transmits the UL MAC CE, and
wherein preferentially sending the UL MAC PDU comprises:
sending the UL MAC PDU, and skipping sending a sidelink medium access control packet data unit (SL MAC PDU);
sending the UL MAC PDU and the SL MAC PDU, and reducing a transmit power of the SL MAC PDU; or
sending the UL MAC PDU and the SL MAC PDU, and increasing a transmit power of the UL MAC PDU.

8. The computer-readable storage medium according to claim 7, wherein the UL MAC CE comprises one or more of the following:
a cell radio network temporary identifier MAC CE, a configured grant confirmation MAC CE, a MAC CE for a link buffer status report (BSR) except a BSR used for padding, a MAC CE for a sidelink buffer status report (SL BSR) except a SL BSR used for padding, and a power headroom report MAC CE.

9. The computer-readable storage medium according to claim 7, wherein obtaining the first configuration information comprises:
obtaining the first configuration information from a local buffer.

10. The method according to claim 1, further comprising preferentially sending the SL MAC PDU if the UL MAC PDU and the SL MAC PDU satisfy a second condition.

11. The method according to claim 10, wherein the second condition is that the UL MAC PDU does not include random access data, the UL MAC PDU does not include emergency call data, and a priority of the UL MAC PDU is lower than or equal to the priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

12. The method according to claim 10, wherein preferentially sending the SL MAC PDU if the UL MAC PDU and the SL MAC PDU satisfy the second condition comprises:
sending the SL MAC PDU, and skipping sending the UL MAC PDU;
sending the UL MAC PDU and the SL MAC PDU, and reducing a transmit power of the UL MAC PDU; or
sending the UL MAC PDU and the SL MAC PDU, and increasing a transmit power of the SL MAC PDU.

13. The method according to claim 1, further comprising preferentially sending the SL MAC PDU and skipping sending the UL MAC PDU, if the UL MAC PDU and the SL MAC PDU overlap in time domain.

14. The apparatus according to claim 4, further comprising preferentially sending the SL MAC PDU if the UL MAC PDU and the SL MAC PDU satisfy a second condition.

15. The apparatus according to claim 14, wherein the second condition is that the UL MAC PDU does not include random access data, the UL MAC PDU does not include emergency call data, and a priority of the UL MAC PDU is lower than or equal to the priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

16. The apparatus according to claim 14, wherein preferentially sending the SL MAC PDU if the UL MAC PDU and the SL MAC PDU satisfy the second condition comprises:
sending the SL MAC PDU, and skipping sending the UL MAC PDU;
sending the UL MAC PDU and the SL MAC PDU, and reducing a transmit power of the UL MAC PDU; or
sending the UL MAC PDU and the SL MAC PDU, and increasing a transmit power of the SL MAC PDU.

17. The apparatus according to claim 4, further comprising preferentially sending the SL MAC PDU and skipping sending the UL MAC PDU, if the UL MAC PDU and the SL MAC PDU overlap in time domain.

18. The computer-readable storage medium according to claim 7, further comprising preferentially sending the SL MAC PDU if the UL MAC PDU and the SL MAC PDU satisfy a second condition.

19. The computer-readable storage medium according to claim 18, wherein the second condition is that the UL MAC PDU does not include random access data, the UL MAC PDU does not include emergency call data, and a priority of the UL MAC PDU is lower than or equal to the priority of the SL MAC PDU, where the priority of the UL MAC PDU is a highest priority of one or more logical channels included in the UL MAC PDU, and the priority of the SL MAC PDU is a highest priority of one or more sidelink logical channels included in the SL MAC PDU.

20. The computer-readable storage medium according to claim 18, wherein preferentially sending the SL MAC PDU if the UL MAC PDU and the SL MAC PDU satisfy the second condition comprises:
sending the SL MAC PDU, and skipping sending the UL MAC PDU;
sending the UL MAC PDU and the SL MAC PDU, and reducing a transmit power of the UL MAC PDU; or
sending the UL MAC PDU and the SL MAC PDU, and increasing a transmit power of the SL MAC PDU.

* * * * *